US008656741B2

(12) United States Patent
Brown

(10) Patent No.: US 8,656,741 B2
(45) Date of Patent: *Feb. 25, 2014

(54) BASE COOLING NOZZLE FOR A POST-MANUFACTURE GLASS CONTAINER THERMAL STRENGTHENING STATION

(75) Inventor: Steven J. Brown, North Granby, CT (US)

(73) Assignee: Emhart Glass S.A., Cham (CH)

( * ) Notice: Subject to any disclaimer, the term of this patent is extended or adjusted under 35 U.S.C. 154(b) by 58 days.

This patent is subject to a terminal disclaimer.

(21) Appl. No.: 13/114,765

(22) Filed: May 24, 2011

(65) Prior Publication Data

US 2011/0289976 A1 Dec. 1, 2011

Related U.S. Application Data

(60) Provisional application No. 61/348,043, filed on May 25, 2010.

(51) Int. Cl.
*C03B 27/06* (2006.01)
(52) U.S. Cl.
CPC .............. *C03B 27/062* (2013.01); *C03B 27/06* (2013.01)
USPC .................................. 65/348; 65/114; 65/349
(58) Field of Classification Search
USPC ................................................... 65/114, 349
See application file for complete search history.

(56) References Cited

U.S. PATENT DOCUMENTS

| | | | |
|---|---|---|---|
| 2,375,944 A * | 5/1945 | Quentin ........................... | 65/115 |
| 2,561,529 A * | 7/1951 | Mongan, Jr. et al. ............ | 65/161 |
| 3,764,284 A * | 10/1973 | Rowe .............................. | 65/60.7 |
| 4,553,998 A | 11/1985 | Jones | |
| 6,705,121 B2 | 3/2004 | Mungovan et al. | |
| 6,766,664 B2 | 7/2004 | Hyre et al. | |
| 6,766,665 B2 | 7/2004 | Hyre et al. | |
| 6,776,009 B2 | 8/2004 | Hyre et al. | |
| 6,776,010 B2 | 8/2004 | Hyre et al. | |
| 6,782,719 B2 | 8/2004 | Fenton | |
| 6,807,826 B2 | 10/2004 | Fenton | |
| 6,807,827 B2 | 10/2004 | Anheyer et al. | |
| 6,807,829 B2 | 10/2004 | Fenton et al. | |
| 6,810,690 B2 | 11/2004 | Fenton et al. | |
| 6,813,905 B2 | 11/2004 | Fenton | |
| 6,823,696 B2 | 11/2004 | Fenton et al. | |
| 6,854,292 B2 | 2/2005 | Pinkerton | |

(Continued)

OTHER PUBLICATIONS

International Search Report from PCT/US2011/037908 issued on Jan. 16, 2012.

*Primary Examiner* — Matthew Daniels
*Assistant Examiner* — Cynthia Szewczyk
(74) *Attorney, Agent, or Firm* — Reinhart Boerner Van Deuren s.c.

(57) ABSTRACT

An apparatus for manufacturing strengthened glass containers, and more particularly the construction and operation of a base cooling nozzle in an apparatus for thermally strengthening glass containers in a glass container manufacturing line at a location intermediate the hot end and the cold end. Glass containers formed at an I.S. machine are conveyed through a special tempering Lehr that heats them uniformly to a high temperature that is short of temperatures at which they may become deformed. Subsequently, the glass containers are rapidly thermally strengthened in a cooling station in which the outer and inner surfaces including all areas of the glass containers are simultaneously cooled to a temperature below the Strain Point of the glass used in the glass containers, with the base cooling nozzles being used to cool the bottoms of the glass containers.

13 Claims, 33 Drawing Sheets

(56) References Cited

U.S. PATENT DOCUMENTS

| | | |
|---|---|---|
| 6,857,291 B2 | 2/2005 | Diehm et al. |
| 6,857,292 B2 | 2/2005 | Fenton |
| 6,865,910 B2 | 3/2005 | Fenton |
| 7,487,650 B2 | 2/2009 | Hyre et al. |
| 7,694,532 B1 | 4/2010 | Boaz |
| 7,779,649 B2 | 8/2010 | Hyre et al. |
| 2003/0108638 A1 | 6/2003 | Neter et al. |
| 2008/0307831 A1 | 12/2008 | Kirkman |

* cited by examiner

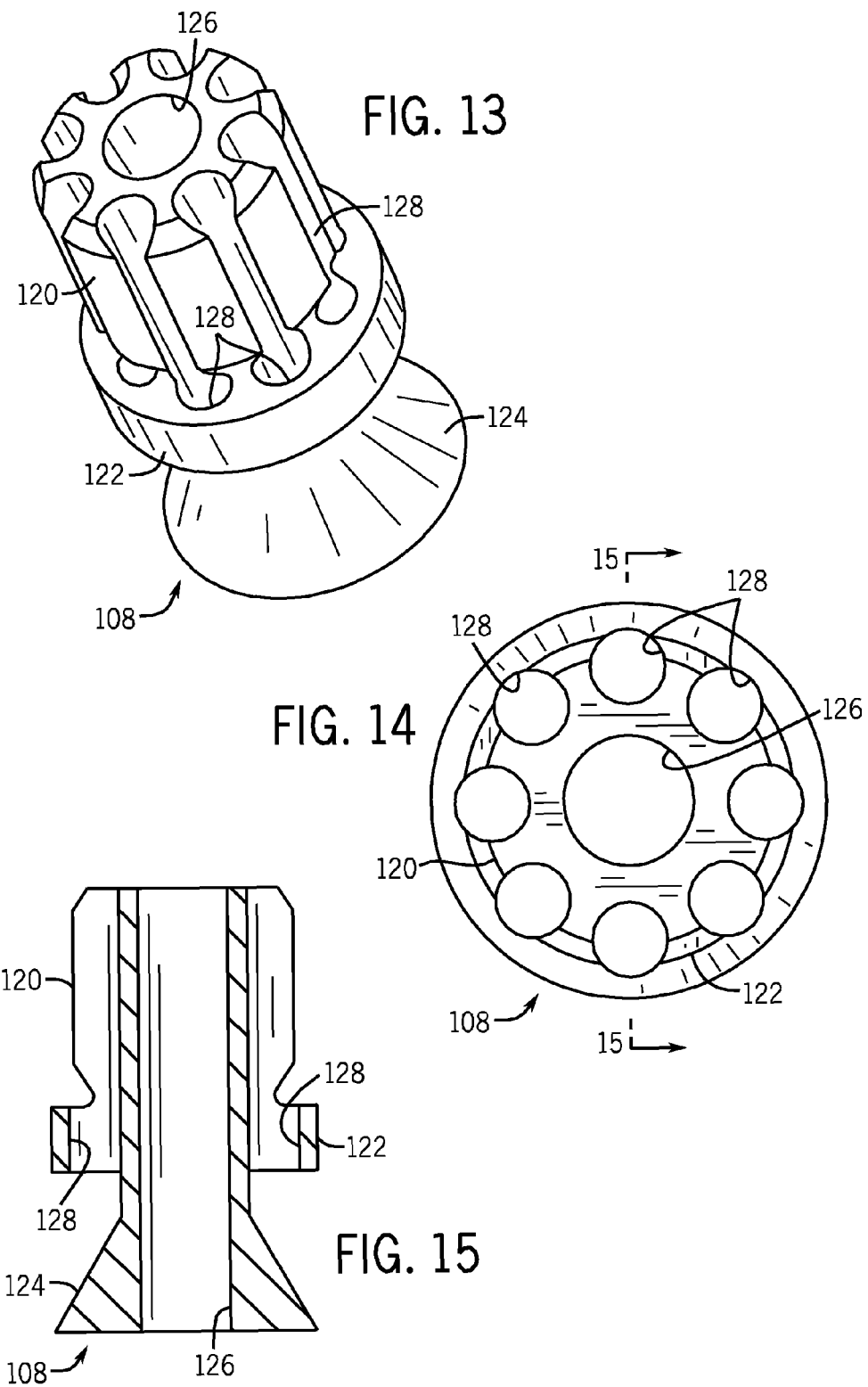

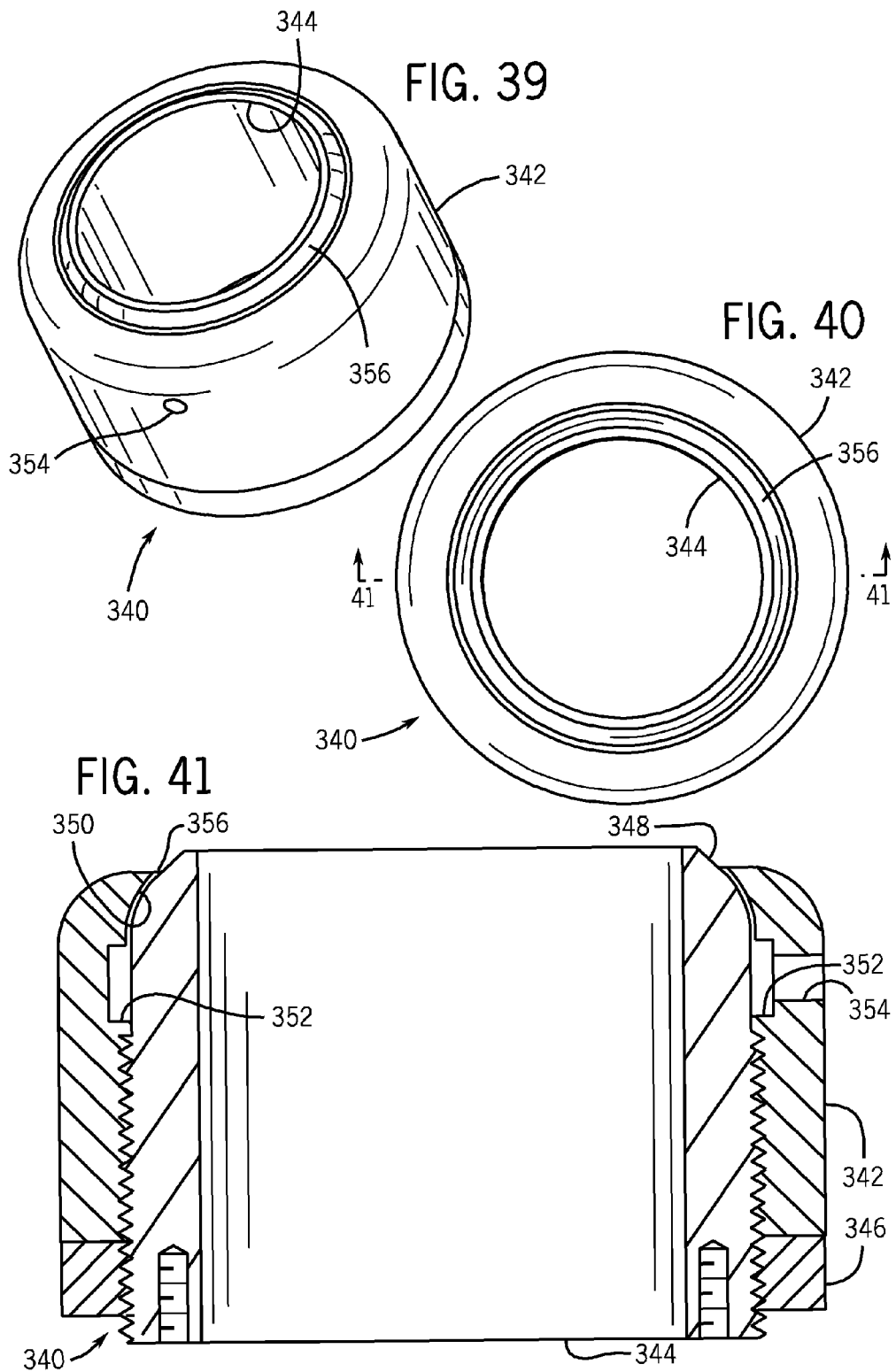

BASE COOLING NOZZLE FOR A POST-MANUFACTURE GLASS CONTAINER THERMAL STRENGTHENING STATION

IDENTIFICATION OF RELATED PATENT APPLICATIONS

This patent application claims priority of U.S. Provisional Patent Application No. 61/348,043, which is entitled "Post-Manufacture Glass Container Thermal Strengthening Method," and which was filed on May 25, 2010, which patent application is hereby incorporated herein by reference in its entirety.

This application is related to seven other concurrently filed copending patent applications, namely U.S. patent application Ser. No. 13/114,628, entitled "Post-Manufacture Glass Container Thermal Strengthening Method;" U.S. patent application Ser. No. 13/114,649, entitled "Post-Manufacture Glass Container Thermal Strengthening Station;" U.S. patent application Ser. No. 13/114,668, entitled "Cooling Tube Mechanism Operation in a Post-Manufacture Glass Container Thermal Strengthening Station;" U.S. patent application Ser. No. 13/114,668, entitled "Cooling Tube Nozzle for a Post-Manufacture Glass Container Thermal Strengthening Station;" U.S. patent application Ser. No. 13/114,744, entitled "Cooling Shroud for a Post-Manufacture Glass Container Thermal Strengthening Station;" U.S. patent application Ser. No. 13/114,779, entitled "Bottom Cooler for a Post-Manufacture Glass Container Thermal Strengthening Station;" and U.S. patent application Ser. No. 13/114,802, entitled "Post-Manufacture Glass Container Thermal Strengthening on a Conveyor," all of which are assigned to the assignee of the present patent application, which seven patent applications are each hereby incorporated herein by reference in their entirety.

BACKGROUND OF THE INVENTION

Field of the Invention

The present invention relates generally to the manufacture of strengthened glass containers, and more particularly to the construction and operation of a base cooling nozzle in an apparatus for thermally strengthening glass containers in a glass container manufacturing line at a location intermediate the hot end and the cold end.

There are two broad categories of glass that are used in glass containers such as bottles, namely "hard" glass and "soft" glass. "Hard" glass, also called borosilicate glass, is made of silica and boron oxide, requires much higher temperatures and is more difficult to form, and costs more than soft glass to manufacture, although it has excellent thermal stress characteristics. "Soft" glass, or soda-lime or soda-lime-silicate glass, is made of soda, lime, silica, alumina, and small quantities of fining agents, and may be manufactured at lower temperatures and is easier to form and cheaper to manufacture, although its thermal stress characteristics are not as good as hard glass. "Soft" glass is the more prevalent type of glass, and it is commonly used for glass containers. For cost reasons, glass containers today are primarily made of soda-lime glass by molding molten glass into glass containers in blow molds.

Glass containers are made in a manufacturing process that has three parts, namely the batch house, the hot end, and the cold end. The batch house is where the raw materials for glass (typically including sand, soda ash, limestone, cullet (crushed, recycled glass), and other raw materials) are prepared and mixed into batches. The hot end begins with a furnace, in which the batched materials are melted into molten glass, and from which a stream of molten glass flows.

The molten glass is cut into cylinders of glass called gobs, which fall by gravity into blank molds. In the blank molds, a pre-container referred to as a parison is formed, either by using a metal plunger to push the glass into the blank mold, or by blowing the glass from below into the blank mold. The parison is inverted and transferred to a mold, where the parison is blown out into the shape of the container. The hot end also includes an annealing process which prevents the containers from having weakened glass caused by stresses due to uneven cooling. The annealing process is used to achieve even cooling, using an annealing oven or Lehr to heat the containers, and then slowly cool them over a twenty to sixty minute period. This annealing process is described, for example, in U.S. Pat. No. 3,463,465, to Fuller, which patent is assigned to the assignee of the present patent application and is hereby incorporated herein by reference. Such a glassware annealing Lehr typically has a plurality of tunnel defining modules connected to one another in an end-toward-end relationship, with an endless conveyor having an upper run extending through the tunnel. Each of the modules has an air circulating chamber below the conveyor upper run, a top portion defining a plenum chamber with an inlet and outlet slots, and air moving means drawing air through the inlet opening and discharging the at a high velocity out of the outlet slots through said conveyor upper run into the circulating chamber.

The equipment at the cold end of the glass container manufacturing process inspects the containers to ensure that they are of acceptable quality. All glass containers are inspected by automated machines after manufacturing for a variety of faults, typically including small cracks in the glass referred to as checks, foreign inclusions referred to as stones, bubbles in the glass referred to as blisters, and excessively thin walls. Sample glass containers are also typically subjected to destructive testing to verify such characteristics as the strength and the hardness of the glass containers.

The assignee of the present patent application developed a process to thermally strengthen these glass containers at the hot end, in part while they are still within the blow molds. Instead of relying solely upon annealing the glass containers in the Lehr to remove stress, both the outside walls and the inside walls of the glass containers are cooled at the hot end within the blow molds prior to transfer to the Lehr to produce heat strengthened soda lime glass containers which have intentionally introduced stress profiles across the walls of the glass container.

This process initially occurs within the blow molds, with the blow heads being moved slightly away from the finish of the blown glass containers and the blow tubes being oscillated up and down within the glass containers to cool their interiors while simultaneously blowing cooling air through passages within the blow molds to cool the exteriors of the glass containers. The formed glass containers are then transferred from the forming stations to deadplate cooling locations at which cooling shrouds or "cans" surround the exteriors of the glass containers and utilize cooling air passing therethrough to cool the external surfaces of the glass containers while oscillating cooling tubes extending into the interiors of the glass containers are used to cool the internal surfaces of the glass containers.

This cooling process causes compressive stresses on both the inside walls and the outside walls of the glass container, and tensional stress in the interior of the walls of the glass container. The thermal energy of the glass containers is thereby reduced to a point where the glass containers are fully tempered before being deposited on a conveyor, and further cooling can accordingly take place at a rapid rate without causing defects in the glass containers. Subsequent conveyor cooling may be performed within a cooling tunnel prior to supplying the partially cooled glass containers to a conventional Lehr.

Thermally strengthened soda lime glass containers that are produced through the use of the improved cooling technology referenced above are substantially stronger and more durable, and are much less likely to break when subjected to mechanical loading or handling or a sudden temperature change. The improvements discussed briefly above are described in greater detail in U.S. Pat. No. 6,705,121, to Mungovan et al., in U.S. Pat. No. 6,766,664, to Hyre et al., in U.S. Pat. No. 6,766,665, to Hyre et al., in U.S. Pat. No. 6,776,0009, to Hyre et al., in U.S. Pat. No. 6,766,010, to Fenton, in U.S. Pat. No. 6,782,719, to Fenton, in U.S. Pat. No. 6,807,826, to Fenton, in U.S. Pat. No. 6,807,827, to Anheyer et al., in U.S. Pat. No. 6,807,829, to Fenton et al., in U.S. Pat. No. 6,810,690, to Fenton et al., in U.S. Pat. No. 6,813,905, to Fenton, in U.S. Pat. No. 6,823,696, to Fenton et al., in U.S. Pat. No. 6,854,292, to Pinkerton, in U.S. Pat. No. 6,857,291, to Diehm et al., in U.S. Pat. No. 6,857,292, to Fenton, in U.S. Pat. No. 6,865,910, to Fenton, in U.S. Pat. No. 7,487,650, to Hyre et al., and in U.S. patent application Ser. No. 11/890,056, to Hyre et al., which patents and patent application are all assigned to the assignee of the present patent application and are all hereby incorporated herein by reference.

There is a continuing focus on the reduction of costs in the bottling industries, and this focus includes a strong desire for a reduction in the weight of glass containers. A reduction in the weight of glass containers decreases the cost in raw materials required to make them as well as the energy required to heat the glass (and the amount of heat that must be removed from formed glass containers). Lighter weight glass containers can also result in a reduction of the cost of transportation, and when emptied there is less material to either recycle or otherwise dispose of.

While glass in its pristine state is extremely strong, stress concentrations are introduced during the forming process. While the shape of glass containers can be optimized to remove unwanted stress increasing geometry, it is inevitable that lighter weight glass containers will have thinner walls. When lighter weight glass containers are manufactured using known glass container manufacturing processes, it is inevitable that, with all other factors being equal, lighter weight glass containers are less strong than heavier (thicker walled) glass containers.

It is accordingly desirable that the present invention provide an improved glass container manufacturing process that results in an increase in the strength of the glass containers manufactured according to the improved process. It is also desirable that this increase in the strength of glass containers be obtainable for glass containers of any design geometry. It is further desirable that the improved glass container manufacturing process make it possible to make lighter weight glass containers that have at least the same strength as conventional non-light weight glass containers.

It is further desirable that the improved glass container manufacturing process be adaptable to existing glass container manufacturing lines. Further, it is desirable that the improved glass container manufacturing process not require either a replacement or a reconfiguration of existing I.S. machines at the hot end of glass container manufacturing lines. It is also desirable that the improved glass container manufacturing process be accomplished without requiring the use of chemical strengthening methods to alter the hardness characteristics of the glass containers.

The apparatus used in the improved glass container manufacturing process must be of construction which is both durable and long lasting, and it should also require little or no maintenance to be provided by the user throughout its operating lifetime. In order to enhance the market appeal of this apparatus, it should also provide sufficient advantage in the manufacture of glass containers over conventional glass container manufacture to thereby afford it the broadest possible market. Finally, it is also an objective that all of the aforesaid advantages be achieved without incurring any substantial relative disadvantage.

SUMMARY OF THE INVENTION

The disadvantages and limitations of the background art discussed above are overcome by the present invention. With this invention, apparatus for thermally strengthening glass containers having a novel base cooling nozzle performs a post-manufacture glass container thermal strengthening process after glass containers are formed at the hot end of a glass manufacturing line (the hot end includes I.S. machines that form the glass containers from gobs of molten glass) and before the cold end of the glass manufacturing line, where complete glass containers are optionally coated and are then inspected. The post-manufacture glass container thermal strengthening process practiced by the present invention takes the place of a conventional annealing operation in a Lehr, where glass containers are gradually cooled in a conventional annealing process.

Glass containers formed in an I.S. machine that are at temperatures of 500 degrees Centigrade to 600 degrees Centigrade are conveyed through a special tempering Lehr that heats them uniformly to a temperature of between approximately 620 degrees Centigrade and approximately 660 degrees Centigrade as they exit the special tempering Lehr. The special tempering Lehr is similar in construction to an annealing Lehr, except that it heats the glass containers up as they pass therethrough. They must be at least approximately 620 degrees Centigrade in order to obtain adequate compressive stresses, and not hotter than approximately 660 degrees Centigrade since at hotter temperatures they may become deformed.

Following heating the glass containers to the desired temperature range, they are subjected to a unique rapid thermal strengthening cooling process in which the outer and inner surfaces including all areas of the glass containers are simultaneously cooled to a temperature below the Strain Point of the glass used in the glass containers. Preferably, the glass containers are cooled in this rapid thermal strengthening cooling process to a temperature range of between approximately 400 degrees Centigrade and approximately 450 degrees Centigrade.

In the preferred embodiment, the rapid thermal strengthening cooling process is accomplished by placing each of the glass containers in a cylindrical cooling shroud that is open on both the top and the bottom thereof. The cooling shroud has a large plurality of tiny apertures located therein through which cooling air is blown to cool the outer surfaces of a glass container located within the cooling shroud. Optionally, the cooling shroud may be rotated and/or oscillated to "smear" the jets of cooling air directed on the outer surfaces of the glass container. A nozzle located in each of the cooling shrouds near the bottom thereof blows cooling air upwardly to cool the bottom of a glass container located within the cooling shroud. Alternatively, an annular bottom cooler blowing cooling air from a circular gap close to the walls in each cooling shroud that is open below the glass container may be used instead of the cooling nozzle. A cooling tube having a nozzle on the bottom thereof is lowered into the glass container and may be oscillated up and down to cool the inner surfaces of a glass container located within the cooling shroud. All of these cooling operations occur simultaneously, with the temperature of the entire glass container thusly being rapidly lowered.

The glass containers are then removed from the cooling shrouds, and may then be placed on a conveyer under or adjacent arrays or banks of fans and further cooled as desired prior to entering the cold end of the manufacturing line. Alternately, additional segments of Lehrs may be used to further cool the glass containers.

In an alternate embodiment, the glass containers are thermally strengthened in a glass container manufacturing line while they are on a conveyor intermediate the hot end and the cold end. In another alternative embodiment, finished annealed glass containers that have been through the entire manufacturing process and are cold may be reheated in a special tempering Lehr to a high temperature and then have the post-manufacture glass container thermal strengthening process practiced by the present invention performed upon them. This may be an alternative when an existing glass container manufacturing line is not to be modified for business reasons.

It may therefore be seen that the present invention teaches a base cooling nozzle in an apparatus for thermally strengthening a glass container in a thermal strengthening post-manufacture process that results in an increase in the strength of the glass containers manufactured according to the process. This increase in the strength of glass containers is obtainable by the post-manufacture glass container thermal strengthening process practiced by the present invention for glass containers of any design geometry. The post-manufacture glass container thermal strengthening process enables the manufacture of lighter weight glass containers that have at least the same strength as conventional non-light weight glass containers.

The post-manufacture glass container thermal strengthening process practiced by the present invention is fully adaptable to most if not all existing glass container manufacturing lines. Further, the post-manufacture glass container thermal strengthening process does not require either a replacement or a reconfiguration of existing I.S. machines at the hot end of glass container manufacturing lines. The post-manufacture glass container thermal strengthening process strengthens glass containers without requiring the use of chemical strengthening methods to alter their hardness characteristics.

The apparatus used in the post-manufacture glass container thermal strengthening process practiced by the present invention is of a construction which is both durable and long lasting, and which will require little or no maintenance to be provided by the user throughout its operating lifetime. The advantages provided by the post-manufacture glass container thermal strengthening process practiced by the present invention substantially enhance its market appeal and thereby afford it the broadest possible market. Finally, all of the aforesaid advantages and objectives of the post-manufacture glass container thermal strengthening process practiced by the present invention are achieved without incurring any substantial relative disadvantage.

DESCRIPTION OF THE DRAWINGS

These and other advantages of the present invention are best understood with reference to the drawings, in which:

FIG. 13 is an isometric view of the tube cooling nozzle illustrated in FIGS. 5 and 6 from the top and side thereof;

FIG. 14 is a top end view of the tube cooling nozzle illustrated in FIGS. 5, 6, and 13;

FIG. 15 is a cross-sectional view of the tube cooling nozzle illustrated in FIGS. 5, 6, 13, and 14;

FIG. 39 is an isometric view of an alternate embodiment bottom cooler for mounting in the bottom of the cooling shroud illustrated in FIGS. 5 through 11 from the top and side thereof;

FIG. 40 is a top end view of the alternate embodiment bottom cooler illustrated in FIG. 39;

FIG. 41 is a cross-sectional view of the alternate embodiment bottom cooler illustrated in FIGS. 39 and 40;

DETAILED DESCRIPTION OF THE PREFERRED EMBODIMENT

Prior to discussing exemplary embodiments of the post-manufacture glass container thermal strengthening or hardening method practiced by the present invention, a brief discussion of some of the principles used by the present invention will be provided. Thermal strengthening of a glass container rapidly cools the inner and outer surfaces of the glass container until the inner and outer surface temperatures are below the glass transition temperature, thereby "freezing" the surface structure of the glass container while allowing the inner glass to continue to flow until its temperature reaches the glass transition temperature, then letting the glass container cool to room temperature. When the glass container reaches room temperature, the inner and outer surfaces of the glass container will be in compression and the interior of the walls of the glass container will be in tension. In a properly controlled cooling process, the stress along the thickness of the walls of the glass container should thus vary from compression at the outer walls to tension in the interior of the walls to compression at the inner walls, with very little or no net radial stress.

Figure 1:
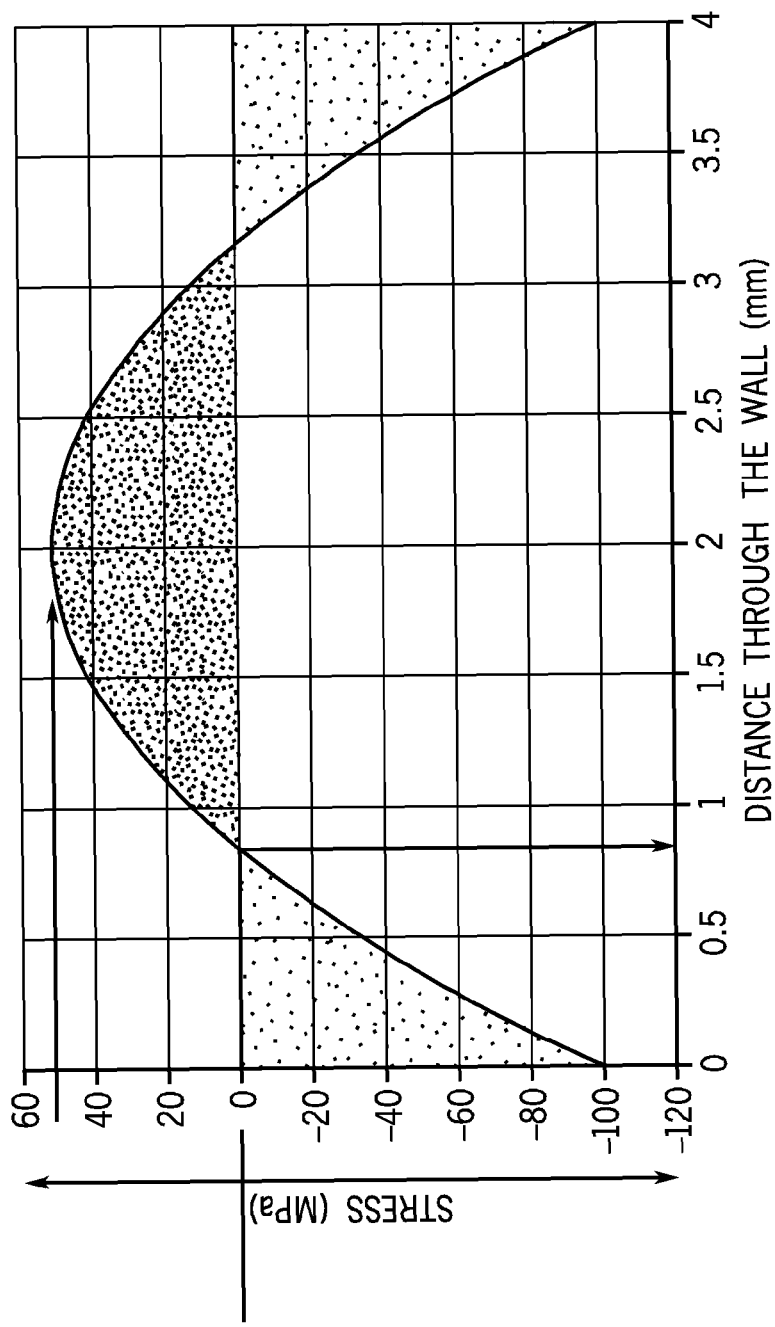
FIG. 1 is a curve representing an optimal stress parabola plotted against the thickness of a side wall of a glass container.

FIG. 1 illustrates a stress parabola that represents the ideal theoretical stress distribution throughout its wall varying from compression at the outer wall of a glass container to tension in the interior of the wall of the glass container (including the midpoint of the wall) to compression at the inside wall of the glass container. The stress profile through the glass is ideally parabolic in shape, having the area under the horizontal axis equal to the area above the horizontal axis, wherein the sum of surface compression is balanced by sandwiched tension to result in a net stress of zero. Ideally, the surface compression zone thickness is typically 21% of the total glass wall thickness on each side, therefore 42% is in compression and 58% in tension. The maximum tension level is typically half of the surface compression stress.

The compression stress levels that are imparted on both inside and outside surfaces of glass containers usually range between −20 MPa and −60 MPa. Industry standard levels for Annealed glass are 0 MPa (±5 MPa), for Heat Strengthened glass are −24 MPa to −52 MPa, for Tempered glass are −69 MPa to −103 MPa, and for Safety Glass are −103 MPa to −152 MPa. The post-manufacture glass container thermal strengthening process practiced by the present invention is capable of producing glass containers having an outside compressive stress of 20 to 60 MPa which results in a buried tensile stress of 10 to 30 MPa.

In order to achieve a balanced stress profile having such compressive stress levels on the inner and outer surfaces of a glass container, it is necessary to cool both surfaces uniformly. Thin sections are the most difficult to temper due to the difficulty of obtaining a large temperature differential between the inner and outer surfaces and the core. Thin sections require higher heat transfer coefficients than do thicker areas.

Figure 2:
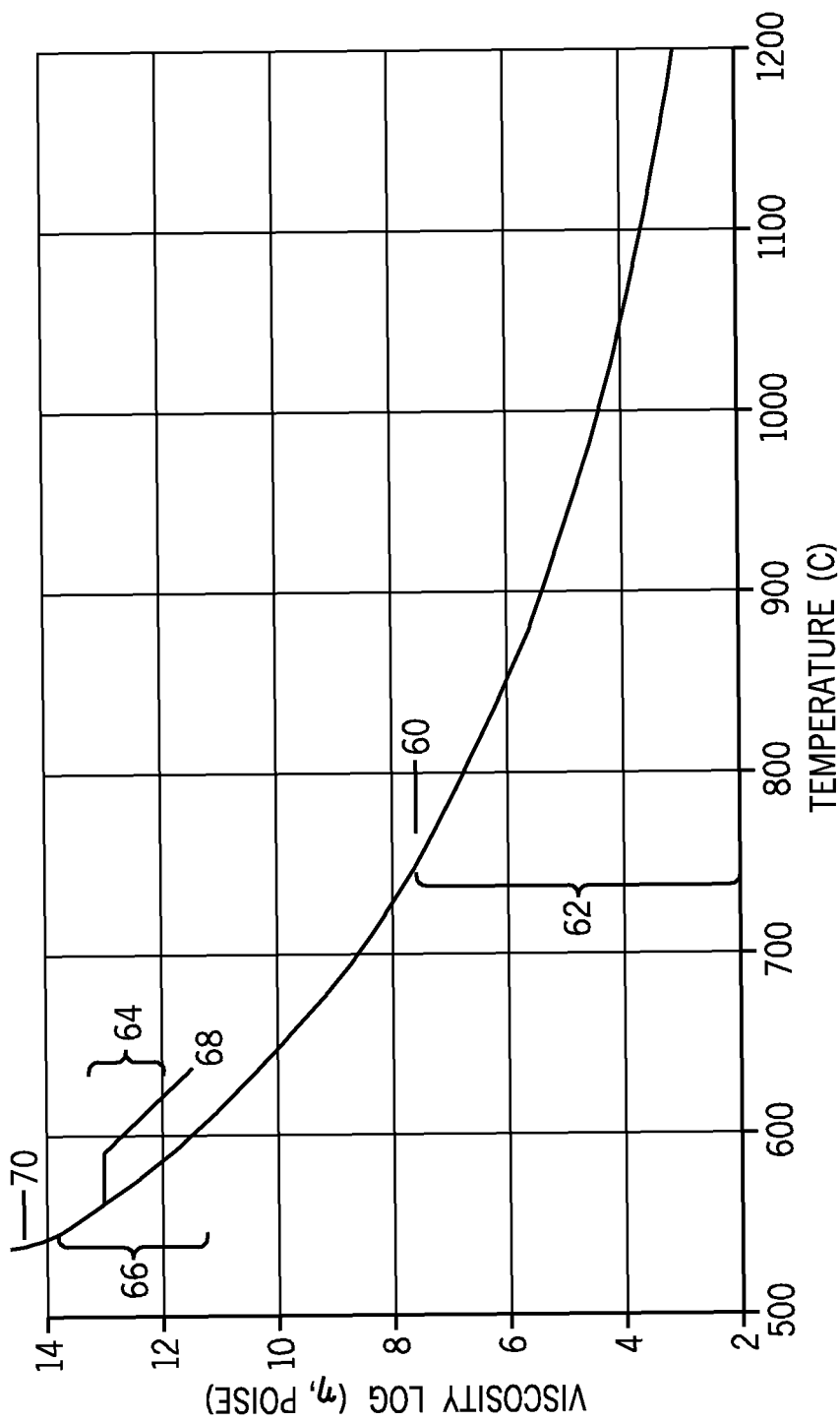
FIG. 2 is a curve representing viscosity plotted against temperature.

FIG. 2 depicts an exemplary viscosity to temperature curve that illustrates several key temperature-dependent characteristics of a typical glass container having the depicted viscosity to temperature curve. After the glass container is fully blown and has been removed from its mold, it must remain cooler than its Softening Point 60, which is typically approximately 748 degrees Centigrade. The glass material of the glass container is a viscous liquid at temperatures above the Softening Point 60, as illustrated by a viscous liquid range characterization 62. Following the molding process, the glass containers are annealed in a conventional Lehr by gradually cooling them across a Glass Transition range 64 which is located in a wider Glass Viscoelastic range 66 in which the glass of the glass container exhibits viscoelastic characteristics. The Glass Transition range 64 is the range of temperatures in which the glass in the glass containers goes from being a super-cooled liquid to being a solid.

An Annealing Point 68 is shown in the Glass Transition range 64, and this Annealing Point 68 represents the temperature at which stresses in the glass container will be relieved in a selected predefined time period, typically a few minutes. For a typical glass container, the Annealing Point 68 temperature may typically be approximately 555 degrees Centigrade. At a temperature below approximately 550 degrees Centigrade, it would take hours instead of minutes to relieve the stresses in the glass container. At temperatures in the Glass Transition range 64 that are higher than the selected Annealing Point 68, it would take less time to relieve the stresses in the glass container. The stresses in the glass containers are locked in by cooling them to a temperature below the Strain Point 70, which is typically approximately 532 degrees Centigrade, although it can vary to as low as approximately 480 degrees Centigrade, depending upon particular glass formula used to make the glass containers. It should be noted that these temperatures must be adhered to for even the thickest areas on the glass containers, which typically cool slower than the thinner areas of the glass containers.

Figure 3:
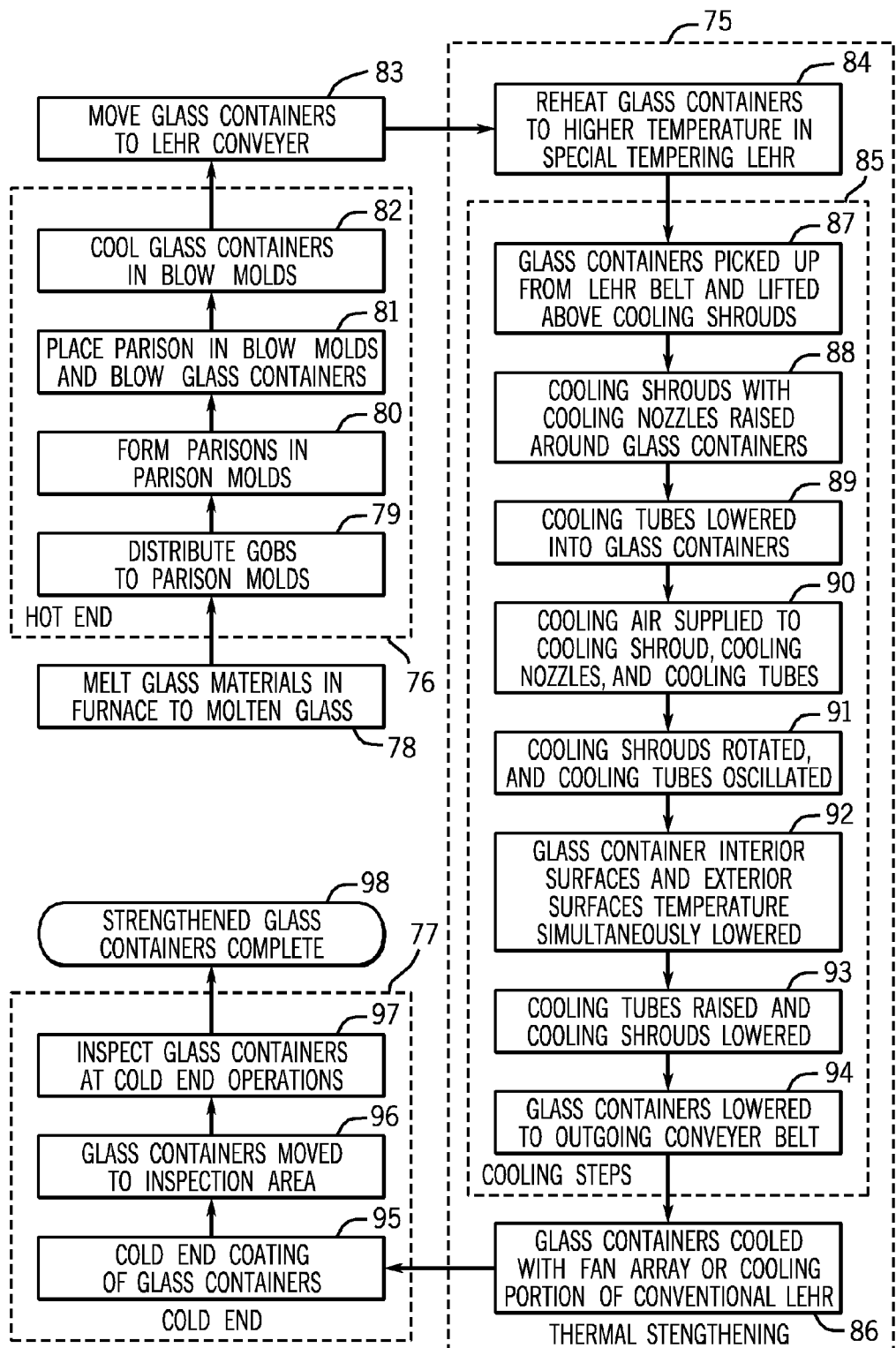
FIG. 3 is flow diagram depicting the post-manufacture glass container thermal strengthening process practiced by the present invention.

Referring next to FIG. 3, the post-manufacture glass container thermal strengthening process practiced by the present invention is illustrated in a flow diagram showing a thermal strengthening process 75 located intermediate a hot end process 76 and a cold end process 77. The process begins at a melt glass materials step 78 in which the materials used to make the molten glass are melted together in a furnace. The molten glass is supplied to the hot end process 76, beginning with the molten glass being distributed to blank or parison molds of an I.S. machine in a distribute gobs to blank molds step 79. Parisons are formed in the parison molds in a form parisons in blank molds step 80.

The parisons are placed within blow molds and blown in a place parisons in blow molds and blow glass containers step 81. The blown glass containers are initially cooled below the Softening Point in the molds in a cool glass containers in blow molds step 82, which ends the operations of the hot end process 76. The hot glass containers are then moved to the Lehr conveyer in a move glass containers to Lehr conveyer step 83, where in a conventional process they would begin the controlled heating and cooling that constitutes the conventional annealing glass container annealing process. As depicted in FIG. 3, however, the hot glass containers are instead subjected to the thermal strengthening process 75 practiced by the present invention.

The hot glass containers (they are typically 500 degrees Centigrade to 600 degrees Centigrade at this point) entering the thermal strengthening process are initially subjected to a reheat glass containers to higher temperature in a special tempering Lehr step 84. The special tempering Lehr is hotter than a conventional Lehr, and may be, for example, set at approximately 600 degrees Centigrade at its entrance and approximately 715 degrees Centigrade at its exit. In the example presented herein, the special tempering Lehr may have a length of sixteen feet (4.9 meters) and may have four independent temperature controlled zones.

The typical time spent by the glass containers in the special tempering Lehr is approximately two and one-half minutes to three and one-half minutes, and the glass containers will be heated to a temperature of between approximately 620 degrees Centigrade and approximately 680 degrees Centigrade (but always to a temperature that is less than the Softening Point). This temperature range is selected because if the glass containers are less than approximately 620 degrees Centigrade adequate compressive stresses cannot be obtained, and if the glass containers are over approximately 680 degrees Centigrade they may become deformed.

Following the reheat glass containers to higher temperature in a special tempering Lehr step 84, the reheated glass containers are subjected to a thermal strengthening cooling process 85, in which the glass containers are cooled to a temperature below the Strain Point, preferably to a range of between approximately 400 degrees Centigrade and approximately 450 degrees Centigrade. In the thermal strengthening cooling process 85 it is necessary that all areas of the glass containers are cooled below the Strain Point, including the thicker areas that typically take longer to cool. This cooling will be discussed in more detail below in conjunction with the discussion of the steps contained in the thermal strengthening cooling process 85.

Following the thermal strengthening cooling step 85, the thermal strengthening process 75 finishes in a glass containers further cooling step 86 in which the temperature of the glass containers is reduced to a temperature of approximately 100 degrees Centigrade to approximately 150 degrees Centigrade. The glass containers further cooling step 86 may be accomplished by the use of fan arrays located over a conveyer transporting the thermally strengthened glass containers as they move from the thermal strengthening process 75 to the cold end process 77.

Alternately, if the post-manufacture glass container thermal strengthening process is integrated into an existing glass container production line in which the first section of the Lehr is used to perform the reheat glass containers to higher temperature in a special tempering Lehr step 84, the remaining sections of the Lehr may be used to cool the glass containers in the glass containers further cooling step 86.

Another alternative would be to use the thermal strengthening process 75 as an operation wholly separate from the glass container manufacturing operation in which finished, fully cooled glass containers would be reheated in the reheat glass containers to higher temperature in a special tempering Lehr step 84, strengthened in the thermal strengthening cooling step 85, and then cooled in the glass containers further cooling step 86.

Returning to the thermal strengthening cooling process 85, a preferred embodiment of this process is shown in the steps illustrated in FIG. 3. The glass containers coming from the special tempering Lehr in the reheat glass containers to higher temperature in a special tempering Lehr step 84 are picked up from the conveyer belt exiting the special tempering Lehr with tongs and are lifted to a position above cooling shrouds in a glass containers picked up and lifted above cooling shrouds step 87. Next, cooling shrouds having cooling nozzles are raised to surround the glass containers in a cooling shrouds with cooling nozzles raised around glass containers step 88, and cooling tubes are lowered into the interiors of the glass containers in a cooling tubes lowered into glass containers step 89.

Cooling air is then supplied to the cooling shrouds, the cooling nozzles, and the cooling tubes in a cooling air supplied to cooling shrouds, cooling nozzles, and cooling tubes step 90, while the cooling shrouds are optionally rotated and the cooling tubes are oscillated in a cooling shrouds rotated and cooling tubes oscillated step 91 to simultaneously cool the exterior surfaces and the interior surfaces of the glass containers. It may be noted that the outside surfaces of the glass container finishes are conductively cooled with tong inserts in the tongs supporting the glass containers throughout the thermal strengthening cooling step 85. The glass containers are cooled to a temperature below the Strain Point in a glass container interior and exterior surfaces temperature simultaneously lowered step 92, preferably to the range of between approximately 400 degrees Centigrade and approximately 450 degrees Centigrade. Cooling times should be relatively fast in order to allow the process to be used in commercial manufacturing operations, and thus should be less than approximately fifteen to approximately twenty seconds for typical glass containers. Typical cooling times have been found to range from approximately nine seconds to approximately twelve and one-half seconds for glass containers weighing from 155 grams to 284 grams, respectively.

When the glass containers have been cooled sufficiently to set the strain in them, the cooling tubes are raised and the cooling shrouds and cooling nozzles are lowered in a cooling tubes raised and cooling shrouds lowered step 93. Next, the thermally strengthened glass containers are lowered to an outgoing conveyer belt in a glass containers lowered to outgoing conveyer belt step 94. This completes the thermal strengthening cooling step 85, and the glass containers then proceed to the glass containers further cooling step 86 which has been previously mentioned.

Following the thermal strengthening process 75, the glass containers may be provided to the cold end of the glass container manufacturing line for application of the cold end process 77. If the glass containers are to be coated, they must be at a temperature of between approximately 100 degrees Centigrade and 150 degrees centigrade. They may be coated, for example, with a lubricious coating in a cold end coating step 95. The glass containers are then transported to an inspection area in a glass containers moved to inspection area step 96, and they are inspected in an inspect glass containers step 97 (where they are typically at a reduced temperature of between approximately 25 degrees Centigrade and 80 degrees Centigrade). The thermally strengthened glass containers are then complete, as indicated in a strengthened glass containers complete termination step 98.

Figure 4:
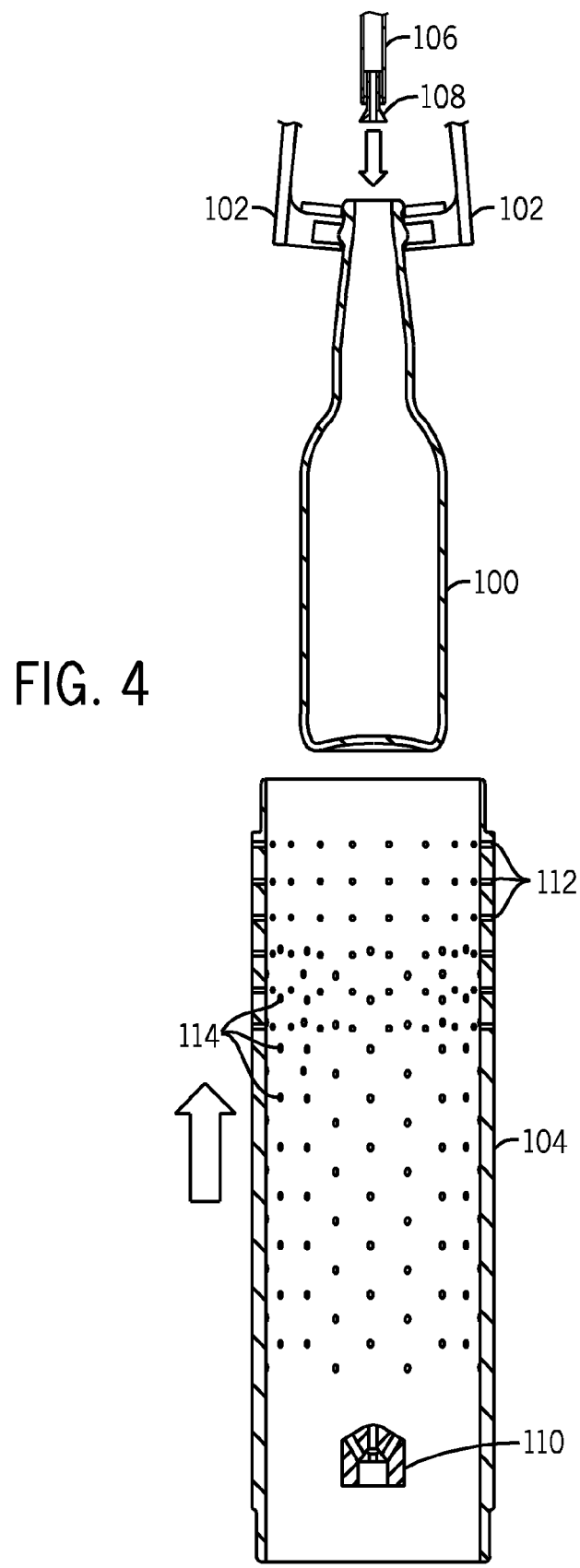
FIG. 4 is a schematic cross-sectional view showing a reheated glass container about to have the post-manufacture glass container thermal strengthening method performed upon it, with a cylindrical cooling shroud and a base cooling nozzle located below the glass container and a cooling tube having a nozzle at its bottom end being located above the glass container.

Moving next to FIG. 4, several of the key components of the post-manufacture glass container thermal strengthening process practiced by the present invention are illustrated in conjunction with a glass container 100. The glass container 100 is supported throughout the post-manufacture glass container thermal strengthening process by tongs 102 that have removed the glass container 100 from a special tempering Lehr (not shown) that has reheated the glass container 100. In FIG. 4, the glass container 100 is shown located directly above a cylindrical cooling shroud 104 and above a bottom cooling nozzle 110 that is located inside the cooling shroud 104 nearer the bottom than the top thereof. A cooling tube 106 having a tube nozzle 108 located at its distal end is shown with the tube nozzle 108 being located above the glass container 100. More detailed descriptions of the cooling shroud 104, the bottom cooling nozzle 104, the cooling tube 106, and the tube nozzle 108 will be provided below in conjunction with FIGS. 7 through 18.

Figures 5, 6:
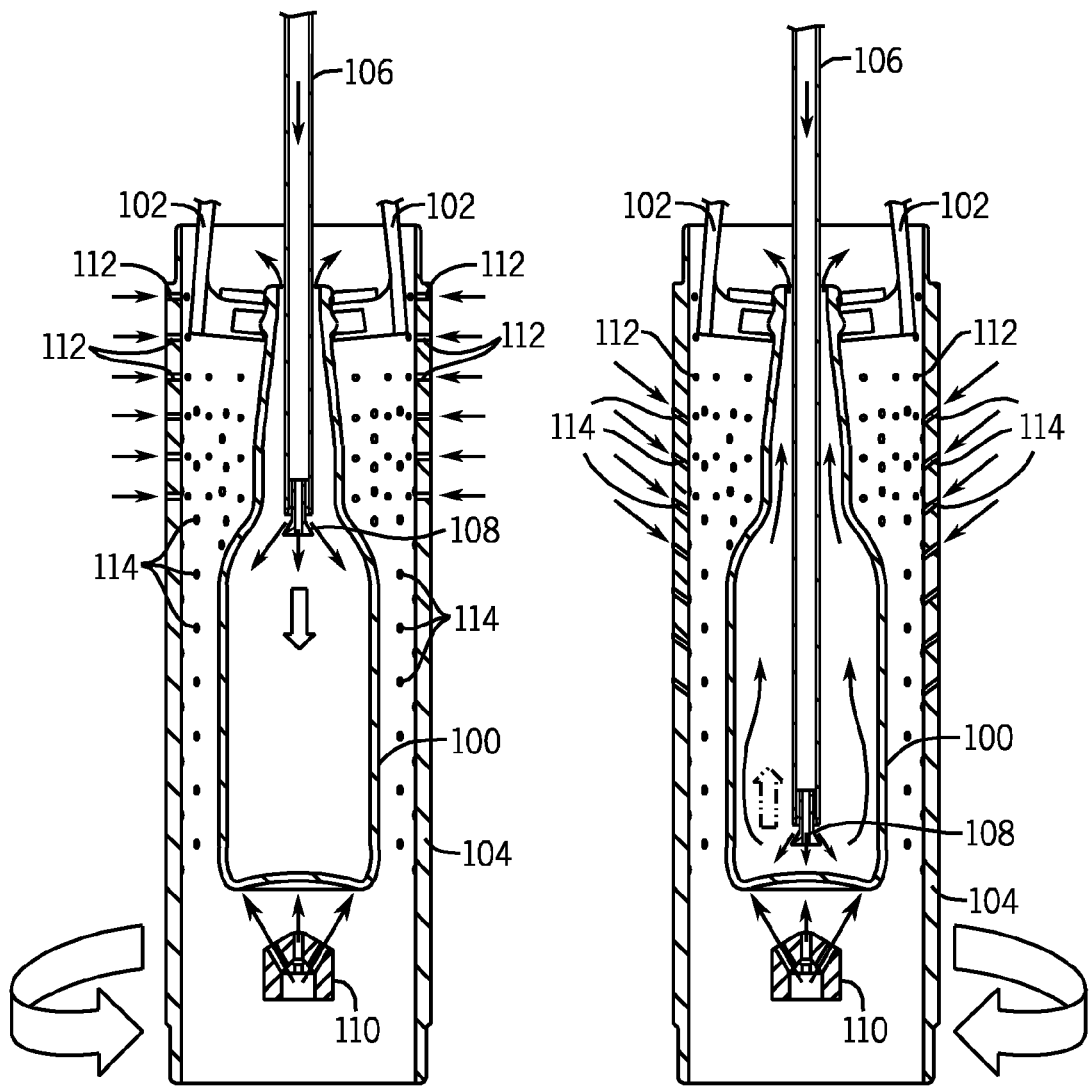
FIGS. 5 and 6 are schematic diagrams showing the glass container shown in FIG. 4 disposed inside the cylindrical cooling shroud and above the base cooling nozzle located in the cooling shroud, with the cooling tube having the nozzle at its bottom end being located inside the glass container to perform the post-manufacture glass container thermal strengthening method.
Figure 7:
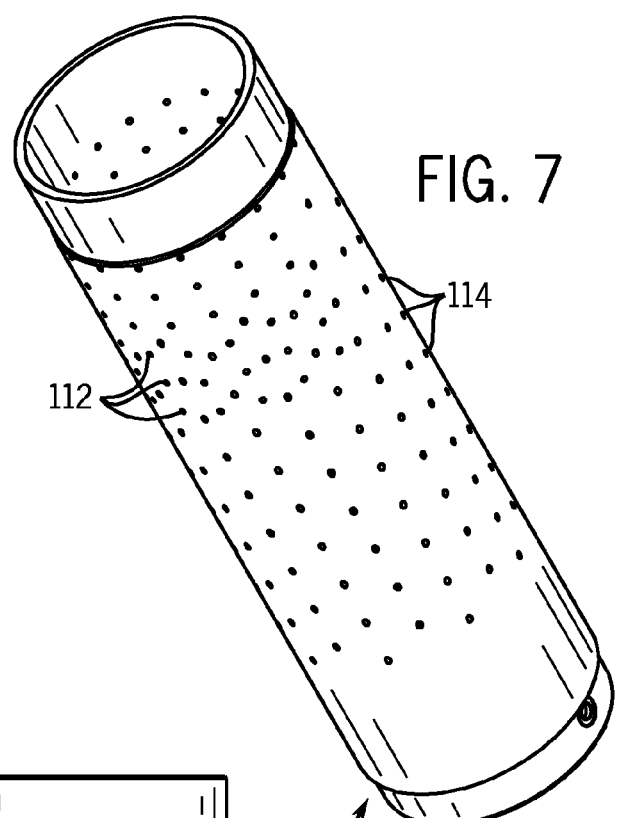
FIG. 7 is an isometric view of the cooling shroud illustrated in FIGS. 5 and 6 from the top and side thereof.
Figure 8:
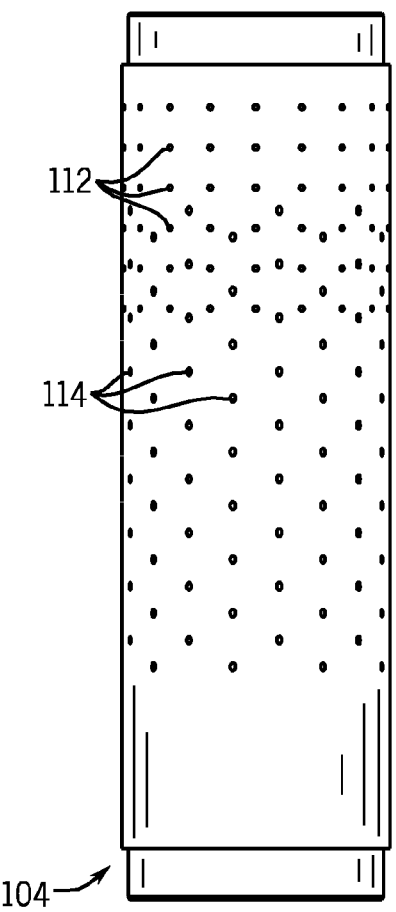
FIG. 8 is a side plan view of the cooling shroud illustrated in FIGS. 5 through 7.
Figure 9:
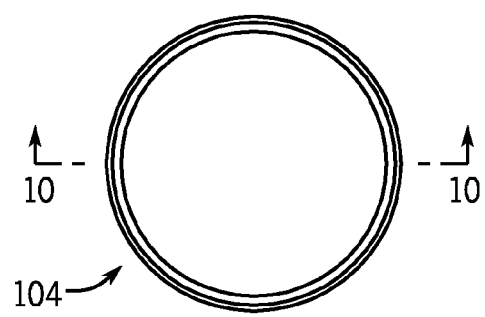
FIG. 9 is a top end view of the cooling shroud illustrated in FIGS. 5 through 8.
Figure 10:
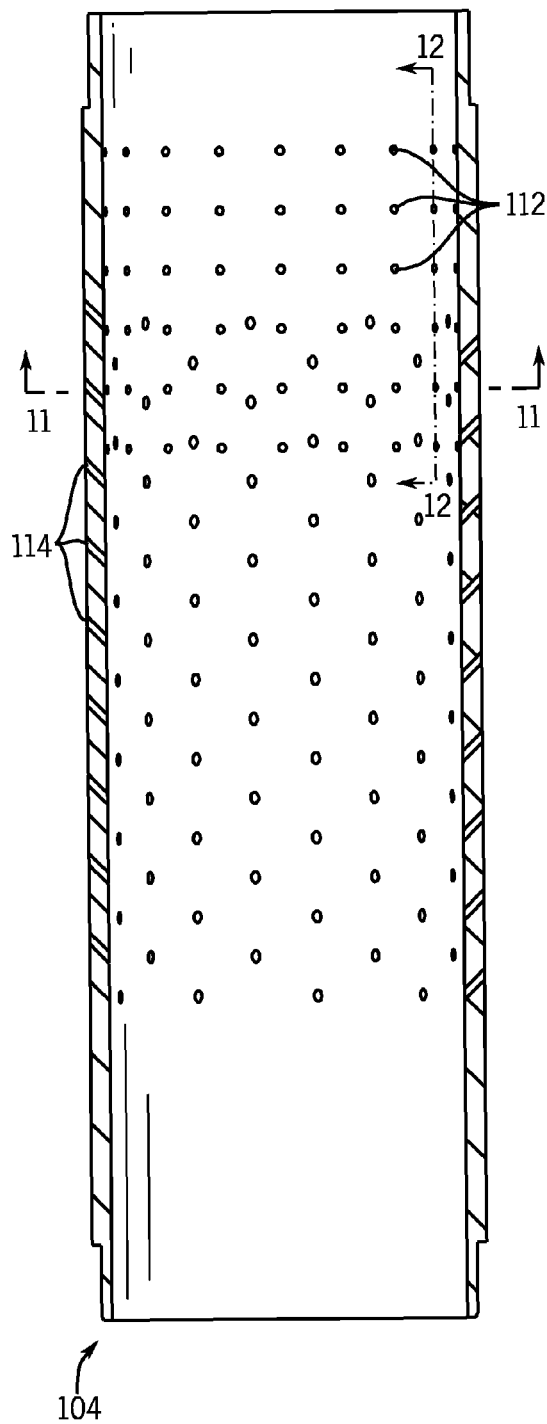
FIG. 10 is a first cross-sectional view of the cooling shroud illustrated in FIGS. 5 through 9.
Figure 12:
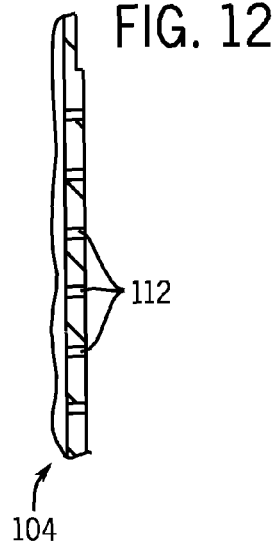
FIG. 12 is an enlarged view of a portion of the cooling shroud illustrated in FIG. 10.
Figure 11:
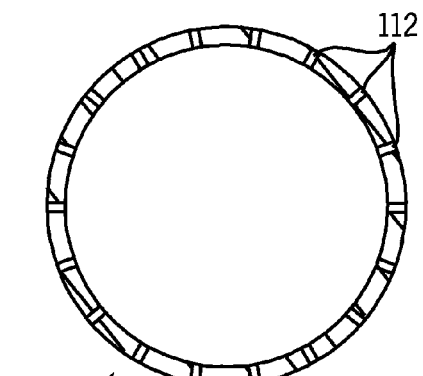
FIG. 11 is a second cross-sectional view of the cooling shroud illustrated in FIGS. 5 through 10.

Referring next to FIGS. 5 and 6, the post-manufacture glass container thermal strengthening apparatus is shown with the glass container 100 lowered entirely into the cooling shroud 104 so that the bottom of the glass container 100 is located above the bottom cooling nozzle 110 to provide cooling air to cool the bottom of the glass container 100. The orthogonal apertures 112 in the cooling shroud 104 direct the flow of cooling air onto the neck and finish of the glass container 100, and the angled apertures 114 direct cooling air onto the lower portion of the neck, the shoulders, and the body of the glass container 100. The cooling shroud 104 may optionally be rotated to "smear" the jets of cooling air from the orthogonal apertures 112 and the angled apertures 114, with the rotation either being continuous or oscillating.

The hole pattern in the cooling shroud 104, the size of the cooling shroud 104 (i.e., the inside diameter and the outside diameter), the number of the apertures 112 and 114, the diameters of the apertures 112 and 114, the pressure setting, and whether the apertures 112 and 114 are radial and/or angled can all be modified to optimize the strength of the glass container 100 by tailoring the compression stress profile on the outer surface of the glass container 100. In this way, strength can be maximized for whatever type of performance requirement that is desired—be it burst, drop, vertical load, impact, or thermal shock resistance. Typical cooling air pressure provided to the cooling shroud 104 may be approximately 75 mbar to approximately 150 mbar.

Cooling air is also supplied through the cooling tube 106 to the tube nozzle 108, which directs cooling air onto the inside surfaces of the glass container 100. The cooling tube 106 and the tube nozzle 108 may be oscillated between the position shown in FIG. 5 near the bottom of the neck of the glass container 100 (or optionally from a position higher up in the neck of the glass container 100) and the position shown in FIG. 6 nearer the bottom of the glass container 100 (or optionally a higher or slightly lower position in the glass container 100). The cooling tube 106 and the tube nozzle 108 may be oscillated between these two positions up to approximately six times per glass container 100, or, optionally, only once to the position shown in FIG. 6. The speed of the oscillation may be constant, or it may vary during the stroke depth, and it may also optionally be paused briefly at any position.

The plunging of the cooling tube 106 inside the glass container 100 sets up beneficial air flow patterns. These flow patterns are enhanced by the engineered geometry of the tube nozzle 108 at the distal end of the cooling tube 106. The feed area (the inside diameter of the cooling tube 106) and the exhaust area (the inside diameter of the finish of the glass container 100 minus the outside diameter of the cooling tube 106) must be carefully balanced to provide for maximum airflow into and out of the glass container 100. The size of the cooling tube 106 may thus be determined.

The position, speed, stroke, and pressure setting of the cooling tube 106 can all be modified to optimize the strength of the glass container 100 by tailoring the compression stress profile on the inner surface. In this way, strength can be maximized for whatever type of performance requirement that is desired—be it burst, drop, vertical load, impact or thermal shock resistance, or adjusted to compensate for bottle geometry considerations (e.g., challenging shapes, wall thickness variations). Typical cooling air pressure provided to the tube nozzle 108 may be approximately 2.7 bar±0.7 bar, and the stroke of the cooling tube 106 and the tube nozzle 108 may be up to approximately 180 mm.

The design of the bottom cooling nozzle 110 may also be modified to facilitate the optimization of the strength of the glass container 100. The bottom cooling nozzle 110 is positioned and to cool the outside bottom of the glass container 100. Typical cooling air pressure provided to the bottom cooling nozzle 110 may be approximately 0.7 bar.

Referring now to FIGS. 7 through 12 in addition to FIGS. 4 through 6, it may be seen that the cooling shroud 104 is open both on the top end and on the bottom end thereof, and has the pluralities of the orthogonal apertures 112 and the angled apertures 114 located in the side walls thereof, each of which may be approximately 2 mm in diameter. The cooling shroud 104 thus functions to cool the outside surfaces of the glass container 100, other than the bottom of the glass container 100. The outer side of the cooling shroud 104 will be supplied with air pressure in an annular cavity formed between the outer surface of the cooling shroud 104 and an enclosing member not shown in FIGS. 7 through 12.

The cooling shroud 104 uses tiny hole patterns (for example, approximately 18 sets of each of the orthogonal apertures 112 and the angled apertures 114) in the side walls thereof to evenly cover the exterior surfaces of the glass container 100. It may be best seen in FIGS. 6 and 10 that the large plurality of angled apertures 114 in the side walls of the cooling shroud 104 are angled downwardly, for example at an angle of approximately 45 degrees. These angled apertures 114 will cool the shoulders and the side wall of the glass container 100. Located above the angled apertures 114 are a large plurality of orthogonal apertures 112 that will cool the neck and outside of the finish of the glass container 100.

The air pressure in the angled apertures 114 and the orthogonal apertures 112 is preferably approximately 75 mbar to 300 mbar (30 to 120 inches of water) as measured in each individual annulus. A large number of tiny angled apertures 114 and the orthogonal apertures 112 are used to evenly cover the exterior surfaces of the glass container 100. In addition, the cooling shroud 104 is rotationally oscillated, and may be axially oscillated instead of or in addition to the rotation, to smooth out the cooling pattern on the glass container 100.

Referring now to FIGS. 13 through 15 in addition to FIGS. 4 and 5, it may be seen that the tube nozzle 108 has an annular upper portion 120 that fits within the interior of the end of the cooling tube 106, and an annular lower portion 122 that abuts the bottom of the cooling tube 106. Located below the annular lower portion 122 is an outwardly flaring frustroconical segment 124 that may be at an angle of approximately 30 degrees from vertical, and may be, for example, approximately 12 mm wide at its widest diameter. A centrally located aperture 126 that may be, for example, approximately 4 mm in diameter, extends through the annular upper portion 120, the annular lower portion 122, and the frustroconical segment 124. Eight radially spaced apart longitudinal apertures 128 that may be, for example, approximately 2.3 mm in diameter, extend through the annular upper portion 120 and the annular lower portion 122.

The cooling tube 106 typically has an approximately twelve millimeter outside diameter and an approximately ten millimeter inside diameter when it will be used with a 330 milliliter single serving beer-container-type finish, and may have an approximately 19.05 millimeter outside diameter and an approximately 16.56 millimeter inside diameter when it will be used with a 500 milliliter glass container of the size typically used for ice tea or juice. Both the cooling tube 106 and the nozzle 108 are easily and quickly replaceable while installed on the post-manufacture glass container thermal strengthening equipment. The cooling tube 106 is mounted in a straight, vertical position, and may be lowered into the interior of the glass container 100.

Air pressure is supplied through the cooling tube 106 to the nozzle 108, and exits the nozzle 108 through the centrally located aperture 126 and the longitudinal apertures 128. The air pressure feeding the cooling tube 106 is preferably approximately 2.0 bar±0.7 bar (30 psi±10 psi). The cooling air exiting the nozzle 108 through the centrally located aperture 126 cools the inside of the glass container 100 at the bottom, while the cooling air exiting the nozzle 108 through longitudinal apertures 128 is dispersed and directed radially outwardly by the frustroconical segment 124. By oscillating the cooling tube 106 up and down, the entire length of the interior surfaces of the glass container 100 may be cooled. In a preferred embodiment, the nozzle 108 can be cycled up and down in an approximately 180 millimeter stroke for a typical long neck beer container. The cooling air supplied by the cooling tube 106 through the nozzle 108 exits the glass container 100 through the finish of the glass container 100.

Figure 16:
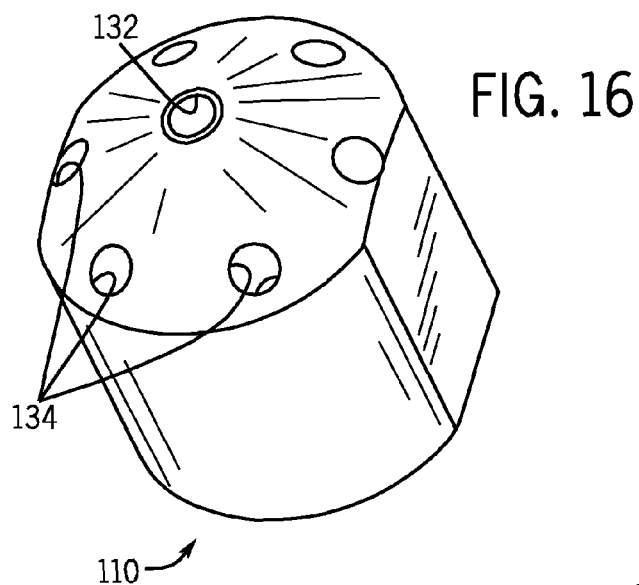
FIG. 16 is an isometric view of the base cooling nozzle illustrated in FIGS. 5 and 6 from the top and side thereof.
Figure 17:
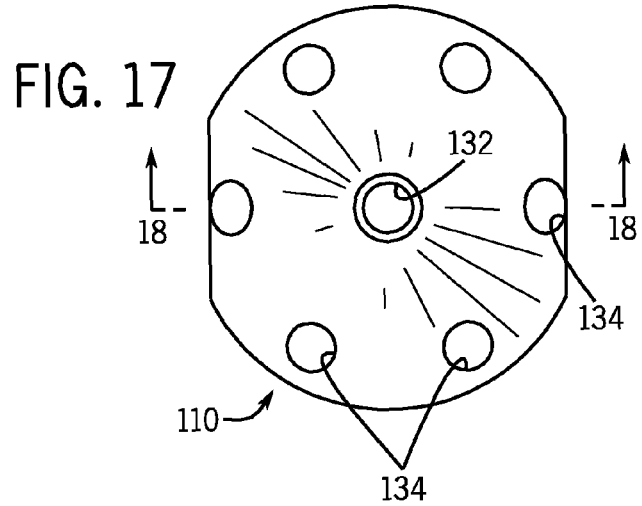
FIG. 17 is a top end view of the base cooling nozzle illustrated in FIGS. 5, 6, and 16.
Figure 18:
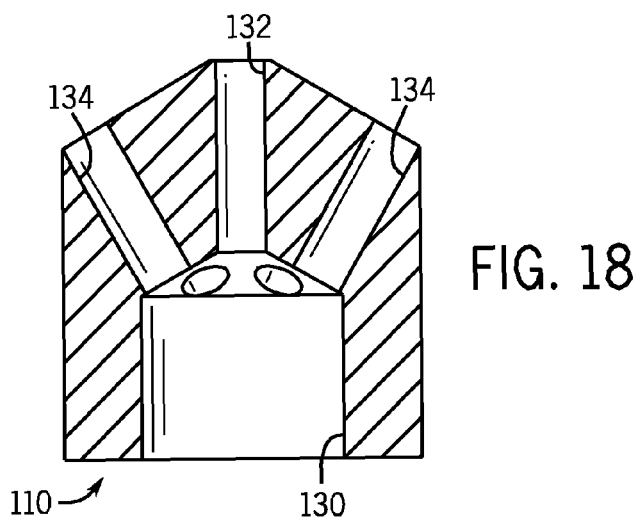
FIG. 18 is a cross-sectional view of the base cooling nozzle illustrated in FIGS. 5, 6, 16, and 17.

Referring now to FIGS. 16 through 18 in addition to FIGS. 4 through 6, it may be seen that the bottom cooling nozzle 110 is mounted in a stationary position coaxially within the cooling shroud 104 near the bottom thereof. The position of the bottom cooling nozzle 110 is adjustable in height for accommodating different bottle sizes within the cooling shroud 104. The bottom cooling nozzle 110 is supplied with cooling air to a chamber 130 located in the bottom thereof by a duct not shown in these figures. The bottom cooling nozzle 110 has a centrally located aperture 132 oriented upwardly which is surrounded by six radially spaced apart angled apertures 134 that may be, for example, at angles of approximately 30 degrees from vertical, with the top of the bottom cooling nozzle 110 being frustroconical and beveled at an angle of approximately 60 degrees from vertical. The centrally located aperture 132 and the angled apertures 134 may be, for example, approximately 3.2 mm in diameter.

Cooling air is supplied to the chamber 130 in the bottom cooling nozzle 110, and then exits the bottom cooling nozzle 110 through the centrally located aperture 132 and the six radially spaced apart angled apertures 134. The air pressure supplied to the bottom cooling nozzle 110 is preferably approximately 0.34 bar to 0.69 bar (5 to 10 psi). The spray pattern of the centrally located aperture 132 and the six radially spaced apart angled apertures 134 covers the bottom surface of the glass container 100. The cooling air supplied by the bottom cooling nozzle 110 exits the cooling shroud 104 at the bottom of the cooling shroud 104. It is essential that the design of the bottom cooling nozzle 110 is such that it will not serve as a catch point for broken glass that might shatter during the cooling process, since such broken glass needs to have a path to fall clearly out of the cooling shroud 104.

Preferably, the tongs 102 (shown in FIGS. 4 through 6) holding the glass container 100 must hold it sufficiently rigidly to prevent it from swinging while it is located in the cooling shroud 104. Alternatively, although they are not shown in the figures, it may be desirable to have a plurality of alignment pins located inside the cooling shroud 104 to prevent the glass container 100 from swinging. The alignment pins would be made of a material capable of withstanding the high temperatures while not causing checks in the glass of the glass container 100. They must also be easily replaceable. Since there will be a scrubbing action between the alignment pins and the glass container 100 due to the rotation of the cooling shroud 102, the alignment pins should be designed with a gap.

Figure 19:
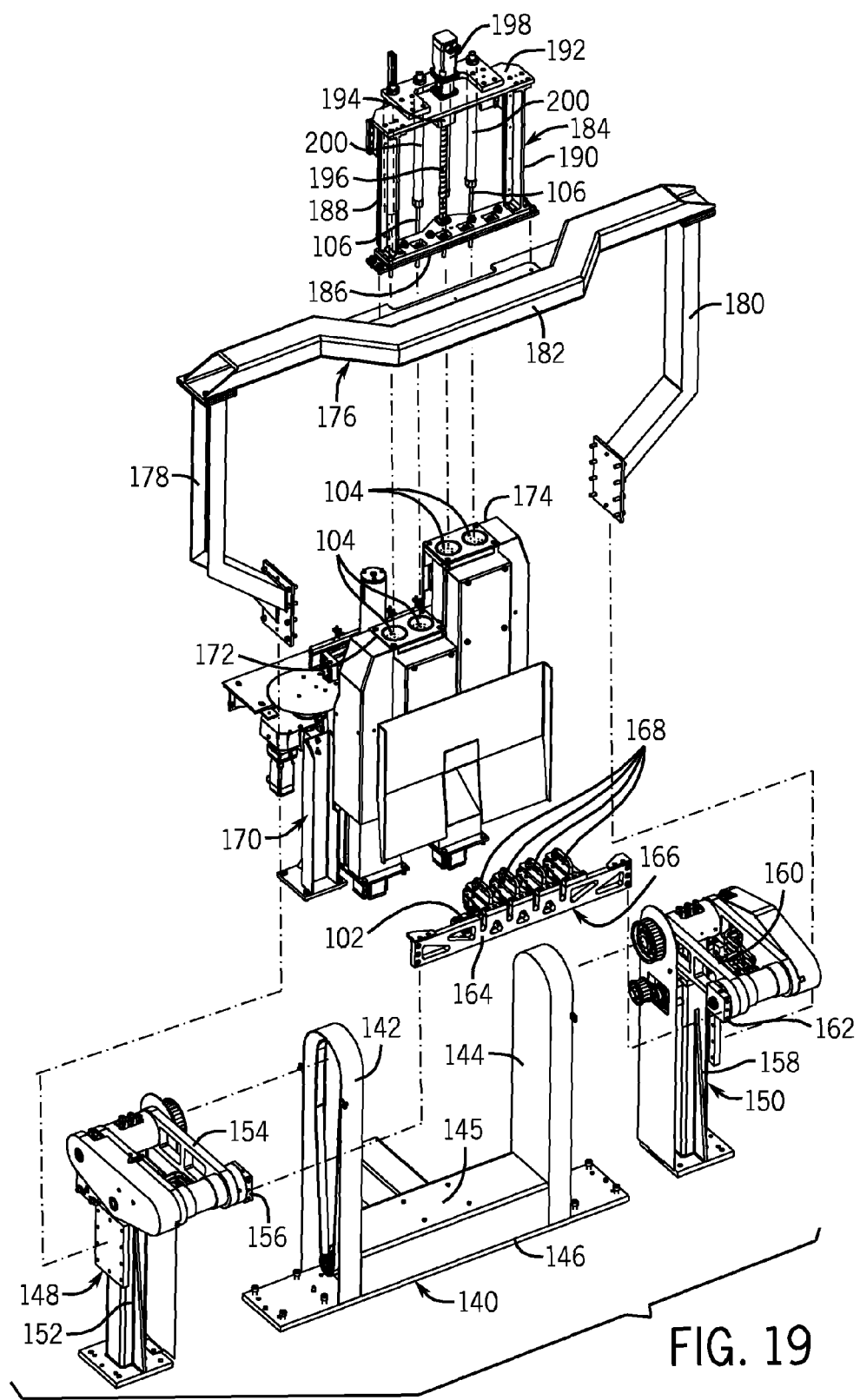
FIG. 19 is an exploded isometric view of a post-manufacture glass container thermal strengthening apparatus for performing the cooling portion of the post-manufacture glass container thermal strengthening process.

Referring next to FIG. 19, the major components of the post-manufacture glass container thermal strengthening apparatus used by the present invention are illustrated. While the thermal strengthening apparatus looks quite complex as shown in the drawings, it is relatively more simple when thought of as an assembly consisting of eight subassemblies. Four of these subassemblies function to move the glass containers, one of the subassemblies functions to cool the outside of the glass containers, one of the subassemblies functions to support a subassembly that cools the interiors of the glass containers, and the last subassembly functions to cool the interiors of the glass containers.

The first subassembly that functions to move the glass containers is a support member 140 located on the floor on which the post-manufacture glass container thermal strengthening apparatus is located that has two upright drive covers 142 and 144 mounted extending upwardly near opposite ends of a base member 146 and a operating mechanism cover 145 located between the upright drive covers 142 and 144. The second subassembly that functions to move the glass containers is a tongs arm support apparatus 148 that is mounted adjacent the upright drive cover 142 and is supported by the base member 146 of the support member 140, and the third subassembly that functions to move the glass containers is a second tongs arm support apparatus 150 that is mounted adjacent the upright drive cover 144 and is supported by the base member 146 of the support member 140.

The tongs arm support apparatus 148 has a support post 152 that supports a tongs drive arm 154 mounted at its proximal end at the top of the support post 152. Located at the distal end of the tongs drive arm 154 is a tongs arm mounting member 156. Similarly, the tongs arm support apparatus 150 has a support post 158 that supports a tongs drive arm 160 mounted at its proximal end at the top of the support post 158. Located at the distal end of the tongs drive arm 160 is a tongs arm mounting member 162.

The fourth subassembly that functions to move the glass containers is a tongs support member 166 having a tongs bar 164 mounted at one end onto the tongs arm mounting member 156 of the tongs drive arm 154 and at the other end onto the tongs arm mounting member 162 of the tongs drive arm 160. Four sets of tongs operating apparatus 168 are supported by the tongs bar 164, with each set of the tongs operating apparatus 168 supporting a pair of the tongs 102 only a portion of one of which pairs is visible in FIG. 19). The tongs arm support apparatuses 148 and 150 function to drive the tongs support member 166 through an approximately 180 degree arc that will pick up the glass containers 100 from a conveyor exiting a special tempering Lehr (not shown in FIG. 19) that reheats the glass containers 100, to move the glass containers 100 to a position in which the post-manufacture glass container thermal strengthening method used by the present invention is performed, and finally to move the glass containers 100 to a conveyor removing the glass containers 100 from the post-manufacture glass container thermal strengthening apparatus.

The tongs arm support apparatus 148 and the tongs arm support apparatus 150 are arranged and configured to operate together, maintaining the tongs bar 164 of the tongs support member 166 parallel to the base member 146 of the support member 140 and a surface upon which the support member 140 is mounted. As the tongs arm support apparatuses 148 and 150 drive the tongs support member 166, the tongs operating apparatus 168, and the tongs 102 through the approximately 180 degree arc, the tongs 102 are all maintained in a vertical position such that the glass containers 100 carried by the tongs 102 will be maintained directly below the tongs operating apparatus 168, irrespective of the angular position of the tongs arm support apparatuses 148 and 150 and the tongs support member 166, the tongs operating apparatus 168, and the tongs 102.

The subassembly that functions to cool the outside of the glass containers is a cooling shroud mechanism 170 that is mounted on the base member 146 of the support member 140 in a location intermediate the upright drive cover 142 and the upright drive cover 144. The cooling shroud mechanism 170 has two shroud mechanism subassemblies 172 and 174 that are located side-by-side on the floor on which the post-manufacture glass container thermal strengthening apparatus is located and between the tongs arm support apparatus 148 and 150, each of which has two cooling shrouds 104 contained therein (and two bottom cooling nozzles 110 not shown in FIG. 19 contained therein). The cooling shroud mechanism 170 also contains apparatus for operating the cooling shrouds 104 and the bottom cooling nozzles 110.

The shroud mechanism subassemblies 172 and 174 have two positions: a first, retracted position in which they are lowered, which is the position shown for the shroud mechanism subassembly 172 in FIG. 19, and a second, extended position in which they are raised, which is the position shown for the shroud mechanism subassembly 174 in FIG. 19. In the lowered position, the tongs support member 166 and the tongs 102 can freely move glass containers either into position for thermal tempering, or away from the cooling position after thermal tempering. In the raised position, glass containers supported by the tongs 102 on the tongs support member 166 with the tongs arm support apparatus 148 and 150 in position for thermal tempering will be contained within cooling shrouds 104 and above bottom cooling nozzle 110 located in the shroud mechanism subassemblies 172 and 174 for thermal tempering.

While the shroud mechanism subassembly 174 is shown in its upwardly extended position and the shroud mechanism subassembly 172 is shown in its downwardly retracted position, it will be appreciated that in operation the shroud mechanism subassemblies 172 and 174 will move together between their downwardly retracted and upwardly extended positions. Other aspects of the cooling shroud mechanism 170 will be discussed below in conjunction with the discussion of FIGS. 31 through 35.

The subassembly that functions to support a subassembly that cools the interiors of the glass containers is a cooling tube support assembly 176 that has two support arms 178 and 180, the bottom ends of which are respectively mounted onto the support post 152 of the tongs arm support apparatus 148 and the support post 158 of the tongs arm support apparatus 150. The support arms 178 and 180 extend upwardly above the cooling shroud mechanism 170, and have a cooling tube assembly support bridge 182 mounted at their respective top ends and extending therebetween above the cooling shroud mechanism 170. The cooling tube assembly support bridge 182 and the support arms 178 and 180 are mounted in a fixed position and are arranged and configured to allow the tongs arm support apparatus 148 and 150 to drive the tongs support member 166 through its approximately 180 degree arc.

Finally, the subassembly that functions to cool the interiors of the glass containers is a cooling tube assembly 184 that is mounted on the cooling tube assembly support bridge 182 above the shroud mechanism subassemblies 172 and 174. The cooling tube assembly 184 supports four of the cooling tubes 106 each having a tube nozzle 108 located at the bottom thereof. The cooling tube assembly 184 has a base plate 186 that is mounted on the cooling tube assembly support bridge 182 of the cooling tube support assembly 176.

Two vertically extending support rails 188 and 190 extend upwardly from the respective ends of the base plate 186. A support plate 192 is mounted between the top ends of the support rails 188 and 190. A crossbar 194 is slidably mounted on the support rails 188 and 190 and is driven in a vertical direction between the support plate 192 and the base plate 186 by a screw mechanism 196 that is operated by a motor 198.

Extending downwardly from the crossbar 194 at spaced-apart intervals are four tube support sleeves 200 (only two of which are shown in FIG. 19) each of which support a cooling tube 106 (only two of which are shown in FIG. 19). The cooling tube assembly 184 is arranged and configured so that the cooling tubes 106 are respectively above and coaxial with the cooling shrouds 104 located in the shroud mechanism subassemblies 172 and 174 of the cooling shroud mechanism 170. Cooling air may be supplied to the cooling tube assembly 184 so that it will be provided to each of the cooling tubes 106.

The cooling tube assembly 184 is operable to drive the cooling tubes 106 between two positions: a first, raised position, and a second, lowered position. In the raised position, the tongs support member 166 and the tongs 102 can freely move glass containers 100 either into position for thermal strengthening, or from the position for thermal tempering after thermal tempering is complete, with the bottom ends of the cooling tubes 106 and the nozzles 108 being located above the tongs support member 166 and the tongs 102 when the cooling tube assembly 184 is in the raised position. In the lowered position, the bottom ends of the cooling tubes 106 and the nozzles 108 will be respectively located deep within glass containers 100 that are supported by the tongs support member 166 and the tongs 102 for thermal tempering.

Figure 20:
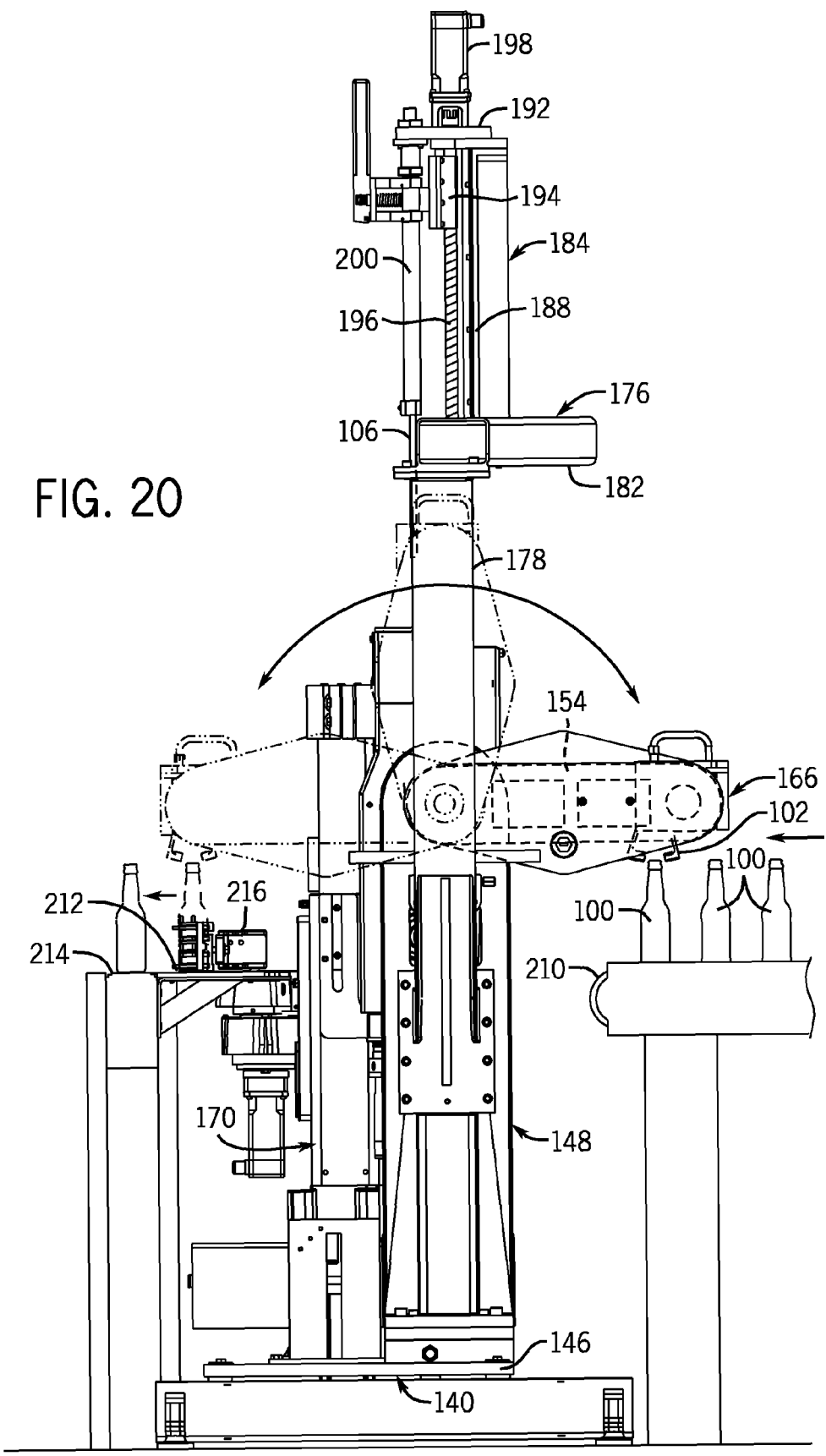
FIG. 20 is a side plan view of the post-manufacture glass container thermal strengthening apparatus illustrated in FIG. 19, also showing the distal end of a supply conveyor for providing reheated glass containers to the post-manufacture glass container thermal strengthening apparatus, as well as the proximal end of a discharge conveyor for conveying thermally strengthened glass containers discharged by the post-manufacture glass container thermal strengthening apparatus.

Referring next to FIG. 20, the post-manufacture glass container thermal strengthening apparatus used by the present invention is shown with a source of reheated glass containers 100 and with the apparatus onto which the thermally strengthened glass containers 100 exit the post-manufacture glass container thermal strengthening apparatus. The post-manufacture glass container thermal strengthening apparatus will move the glass containers 100 between three positions: a first position in which they will be picked up from a supply conveyor 210 after they have been reheated, a second position at which the glass containers 100 will be thermally cooled, and a third position at which the glass containers 100 will be deposited on a deadplate 212. While in the exemplary embodiment illustrated herein the tongs support member 166 has four sets of tongs 102 mounted therefrom, each of which tongs 102 may be used to pick up and move a single glass container 100, it will be appreciated that any number of sets of tongs 102 may instead be used.

The supply conveyor 210 provides the reheated glass containers 100 to the post-manufacture glass container thermal strengthening apparatus, and the tongs 102 of the tongs drive arm 154 picks up the glass containers 100 and moves them in an arc by the rotation of the tongs arm support apparatus 148 and 150 (the latter of which is not shown in FIG. 20). The reheated glass containers 100 are moved in a counterclockwise arc approximately 90 degrees to a position in which they are thermally strengthened.

The thermally strengthened glass containers 100 continue to be moved counterclockwise in an arc by the rotation of the tongs arm support apparatus 148 and 150 for an additional approximately 90 degrees, at which point the thermally strengthened glass containers 100 are deposited by the tongs 102 on the deadplate 212. After the tongs 102 are raised, the thermally strengthened glass containers 100 are pushed onto an exit conveyor 214 by a pusher mechanism 216. The thermally strengthened glass containers 100 may then be conveyed away from the post-manufacture glass container thermal strengthening apparatus, and may optionally be further cooled by fans or a subsequent cooling unit (not shown in FIG. 20).

Figure 21:
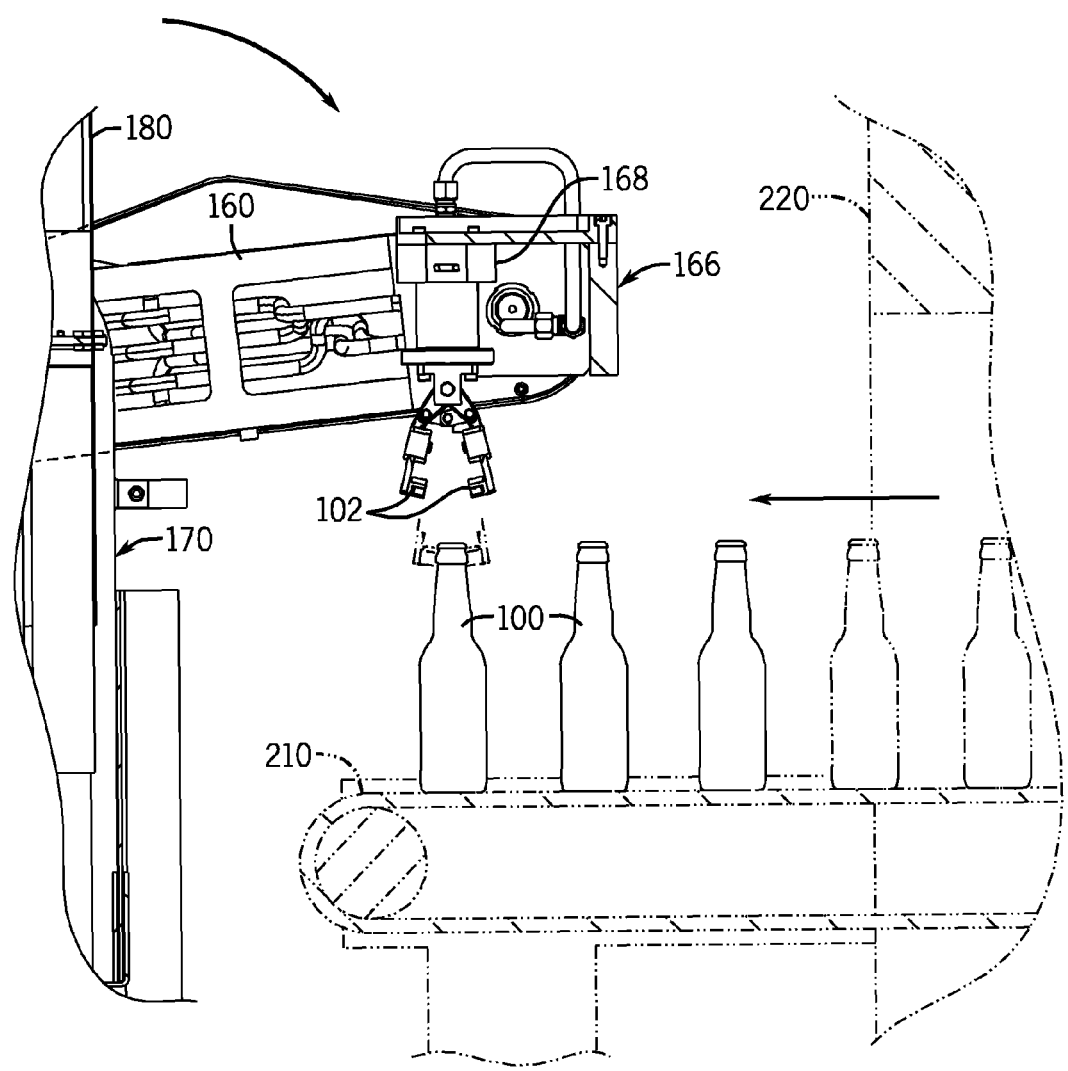
FIGS. 21 through 28 are cross-sectional side views of portions of the post-manufacture glass container thermal strengthening apparatus and the ends of the supply and discharge conveyors showing the sequence of operations as a reheated glass container has the post-manufacture glass container thermal strengthening method used to thermally strengthen it.

Referring now to FIGS. 21 through 28, a complete sequence of the post-manufacture glass container thermal strengthening method is illustrated. These figures are all shown as cross-sections along the centerline of the post-manufacture glass container thermal strengthening apparatus. In FIG. 21, the reheated glass containers 100 are shown exiting a special tempering Lehr 220 adjacent to the post-manufacture glass container thermal strengthening apparatus on the supply conveyor 210. The special tempering Lehr 220 is preferably located immediately downstream of the I.S. Machine (not shown in FIGS. 21 through 28) as closely as possible to minimize cooling of the glass container 100 before they enter the special tempering Lehr 220. The tongs support member 166 is being rotated clockwise in an arc with the tongs 102 shown just above a reheated glass container 100. It will continue to rotate clockwise until the tongs drive arm 160 is approximately horizontal, at which time the tongs 102 will grasp the finish of a reheated glass container 100, the position of the tongs 102 at that time being illustrated in phantom lines.

Figure 22:
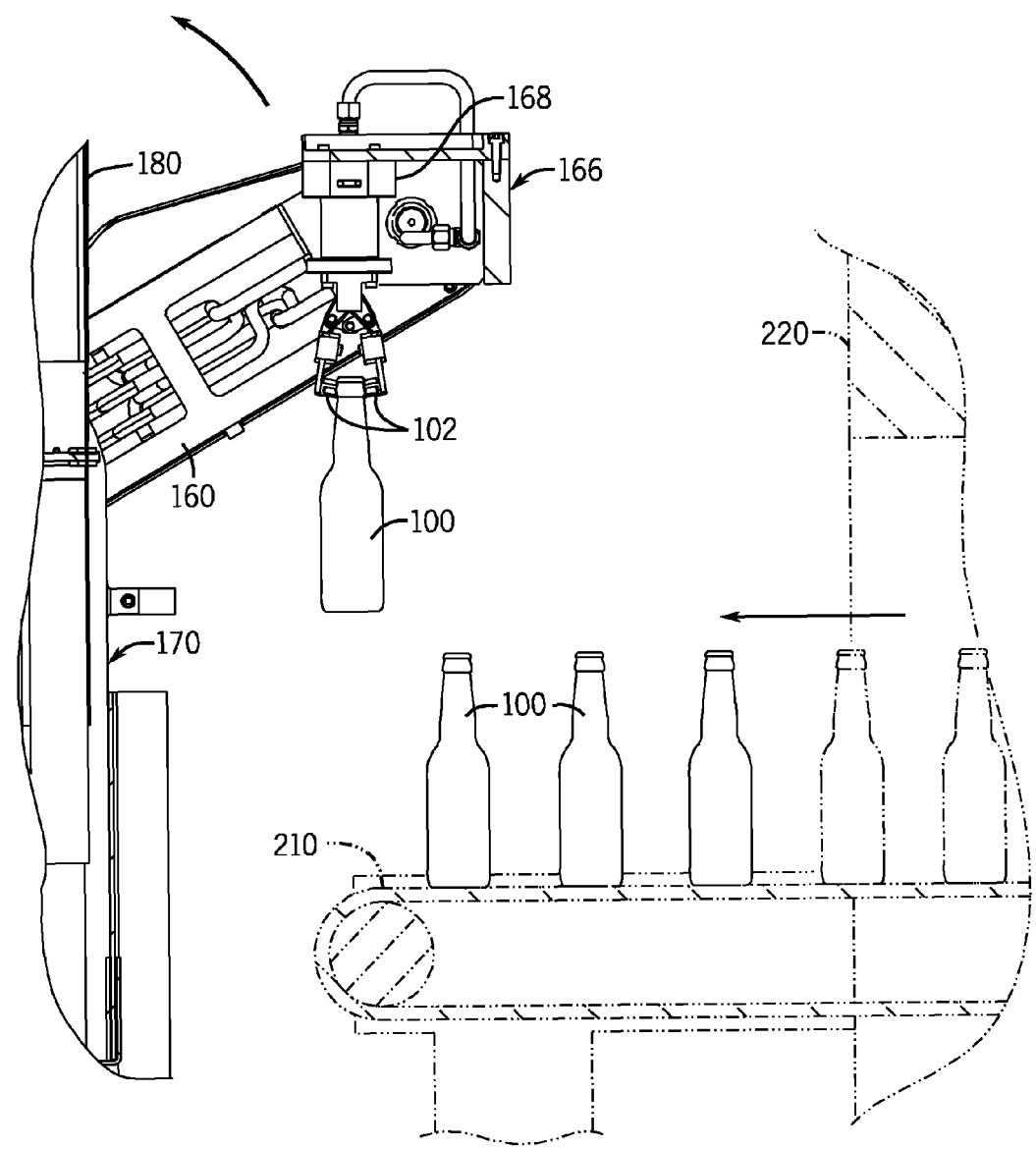
Figure 23:
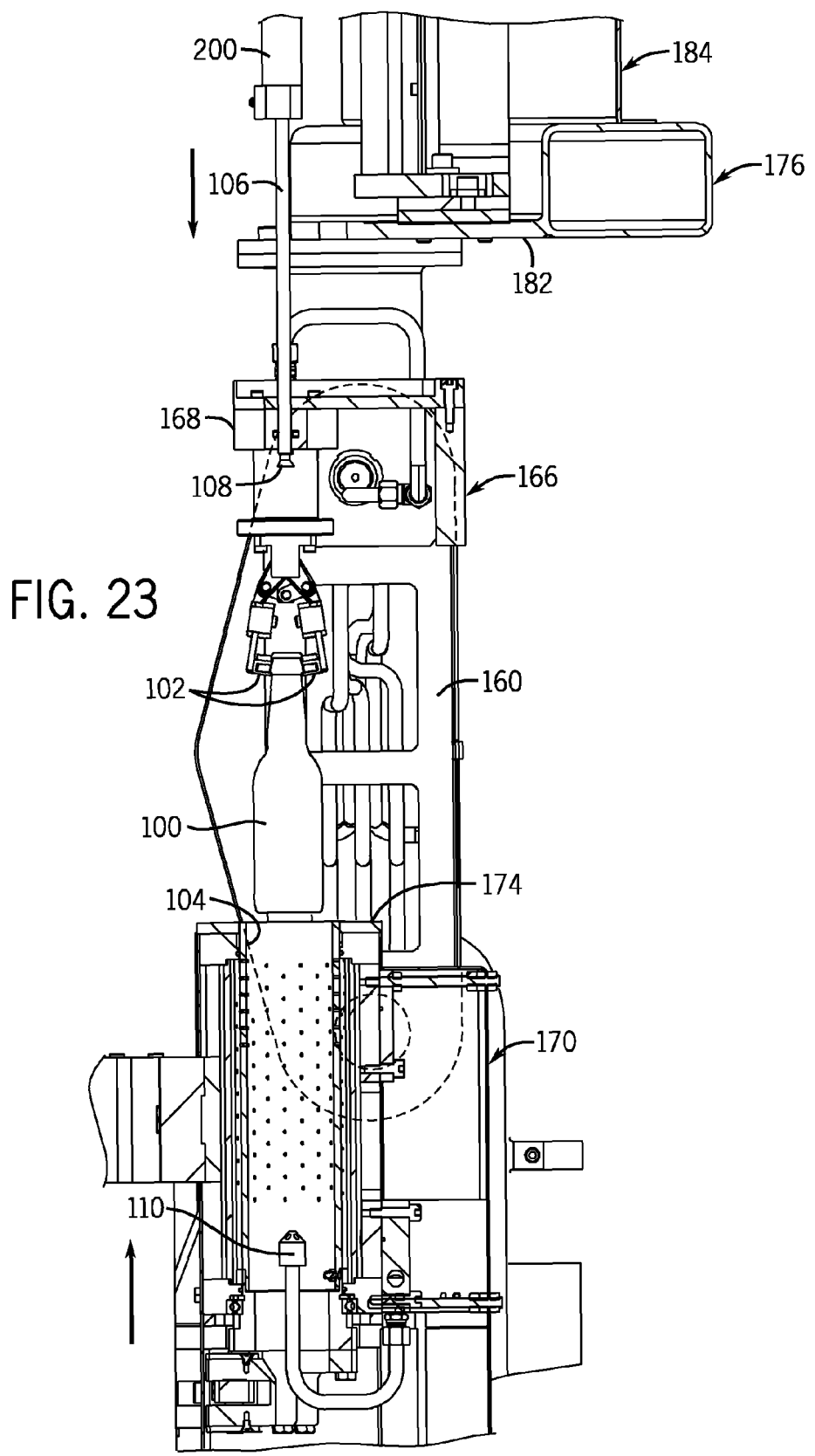

Following the tongs 102 grasping the finish of a reheated glass container 100, the tongs support member 166 will begin to be rotated counterclockwise in an arc with the tongs 102 lifting the reheated glass container 100 off of the supply conveyor 210 in a counterclockwise arc as shown in FIG. 22. The tongs support member 166 will continue to rotate counterclockwise in an arc with the tongs 102 until the tongs support member 166 is vertical, in which position the reheated glass container 100 is located above the cooling shroud 104 and below the cooling tube 106 and the tube nozzle 108, as shown in FIG. 23.

Figure 24:
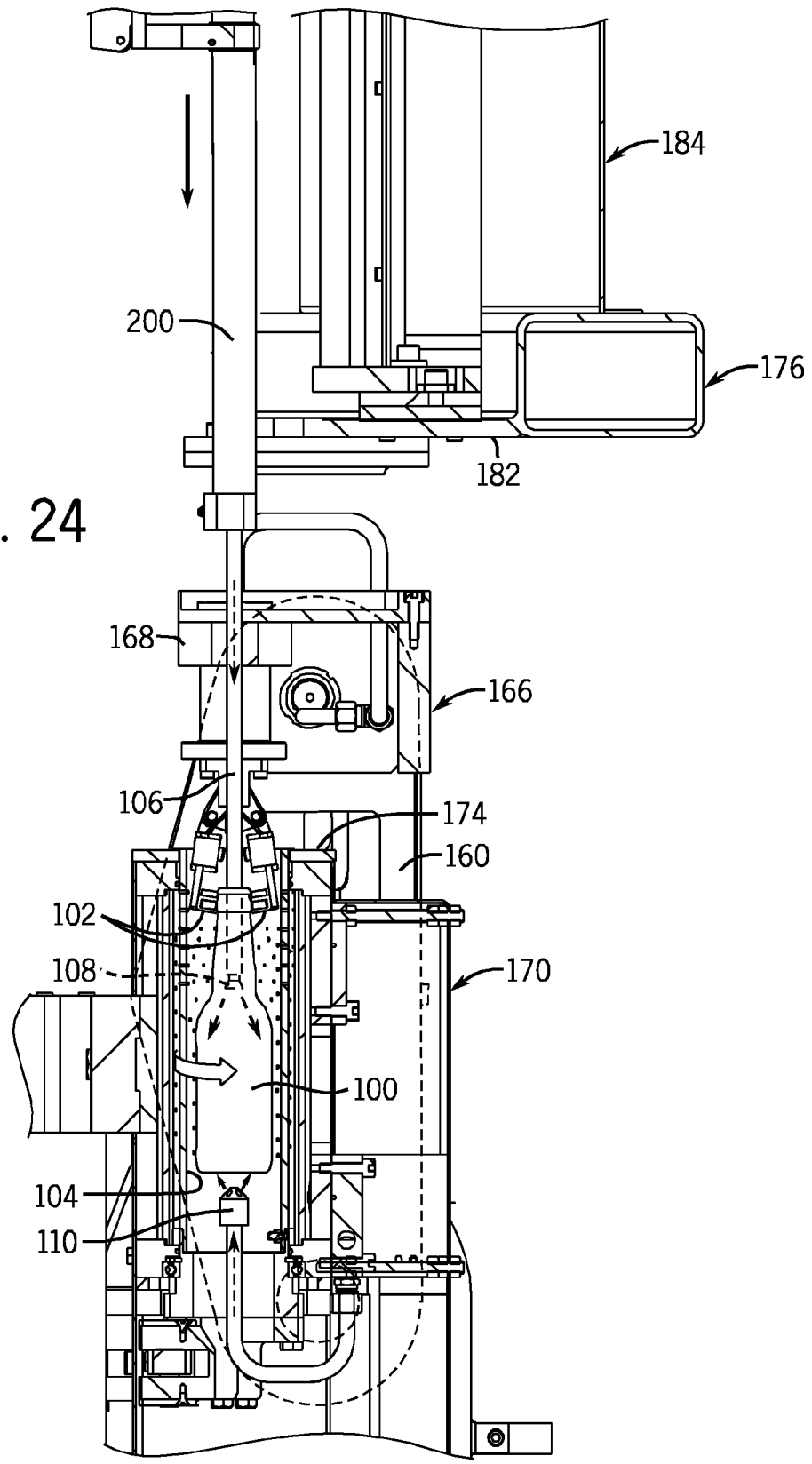
Figure 25:
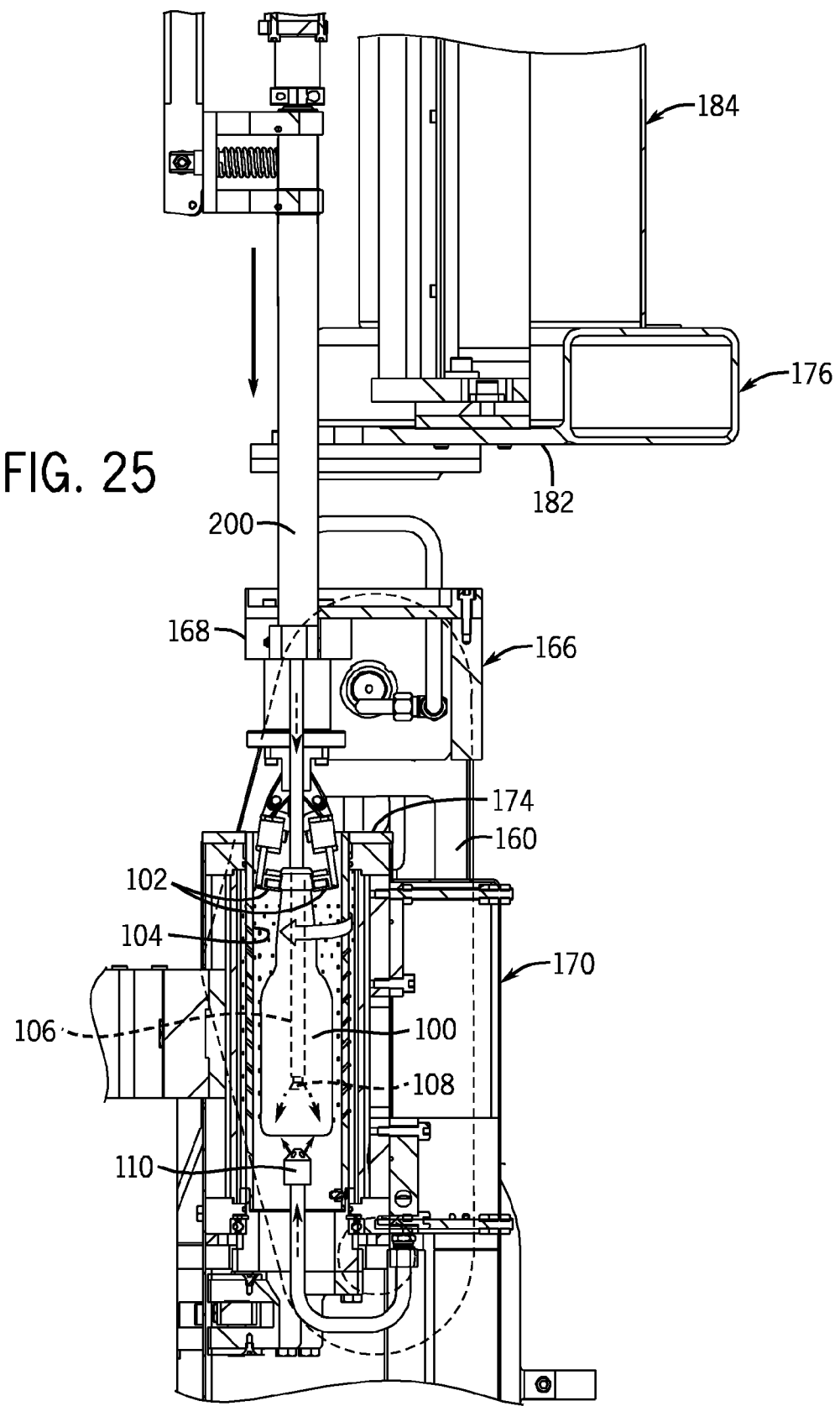

As shown in FIG. 24, the cooling shroud 104 will be raised by the shroud mechanism subassembly 174 of the cooling shroud mechanism 170 to surround the reheated glass container 100, with the bottom cooling nozzle 110 located just below the bottom of the reheated glass container 100, and the cooling tube 106 and the tube nozzle 108 will be lowered by the cooling tube assembly 184 until the tube nozzle 108 is in the neck of the reheated glass container 100. At this point, cooling air will be provided by one or more cooling air sources to the cooling shroud 104, to the cooling tube 106 and the tube nozzle 108, and to the bottom cooling nozzle 110.

The cooling shroud 104 optionally is rotated and/or oscillated up and down slightly to smear cooling air coming in from the orthogonal apertures 112 and the angled apertures 114 (both of which are shown in FIGS. 5 and 6) onto the outer surfaces of the reheated glass container 100 to cool them. Simultaneously, the bottom cooling nozzle 110 will direct cooling air onto the bottom of the reheated glass container 100 to cool it. Also simultaneously, the cooling tube 106 and the tube nozzle 108 will be oscillated between the higher position shown in FIG. 24 and a lower position shown in FIG. 25 to cool the inner surfaces of the reheated glass container 100. As mentioned previously, the cooling tube 106 and the tube nozzle 108 may be oscillated between one and approximately six times.

At this point, the glass container 100 surfaces are cooled quickly and uniformly, setting up a temperature profile through the glass which results in a permanent stress profile once all of the glass is cooled below the Strain Point, preferably to a range of between approximately 400 degrees Centigrade and approximately 450 degrees Centigrade. Since all areas of the glass containers 100 are cooled below the Strain Point, including the middle of the thicker areas that typically take longer to cool, the stress profile throughout the glass containers 100 will be closer to an ideal theoretical stress distribution throughout the walls of the glass container 100, varying from compression at the outer wall of a glass container to tension in the interior of the wall of the glass container to compression at the inside wall of the glass container. This results in the glass containers 100 being stronger, and also makes possible the manufacture of thinner walled and lighter glass containers that still have excellent strength characteristics.

Figure 26:
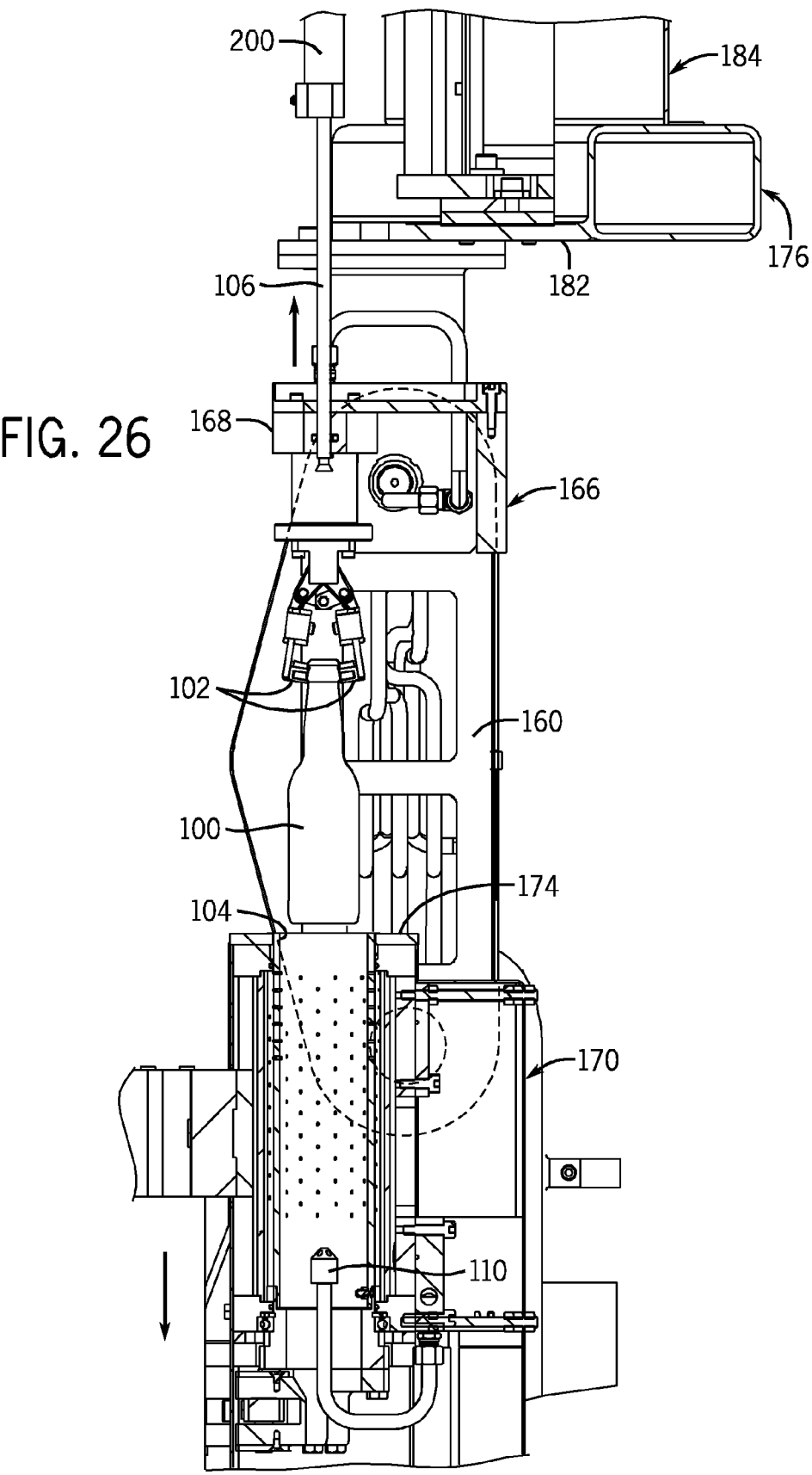

Following the performance of the post-manufacture glass container thermal strengthening method as shown in FIGS. 24 and 26, the cooling shroud 104 and the bottom cooling nozzle 110 will be lowered by the shroud mechanism subassembly 174 of the cooling shroud mechanism 170 to positions below the thermally strengthened glass container 100, and the cooling tube 106 and the tube nozzle 108 will be raised by the cooling tube assembly 184 until the tube nozzle 108 is above the neck of the thermally strengthened glass container 100, as shown in FIG. 26.

Figure 27:
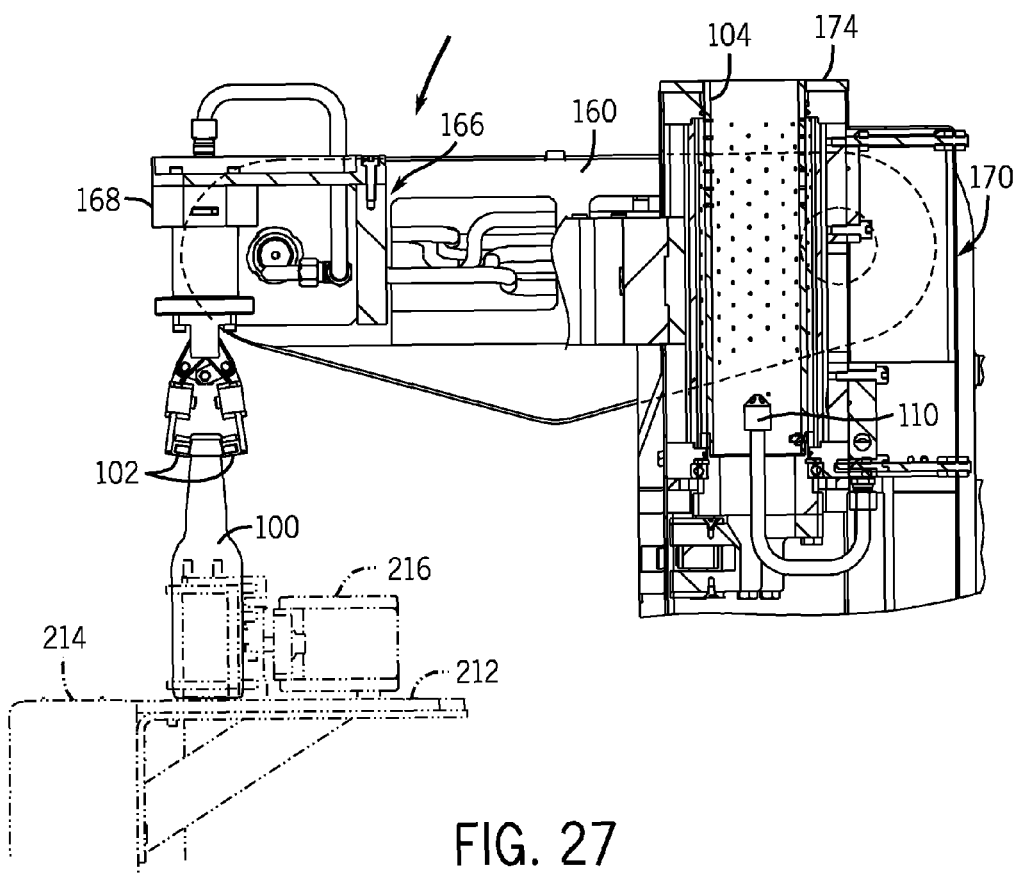
Figure 28:
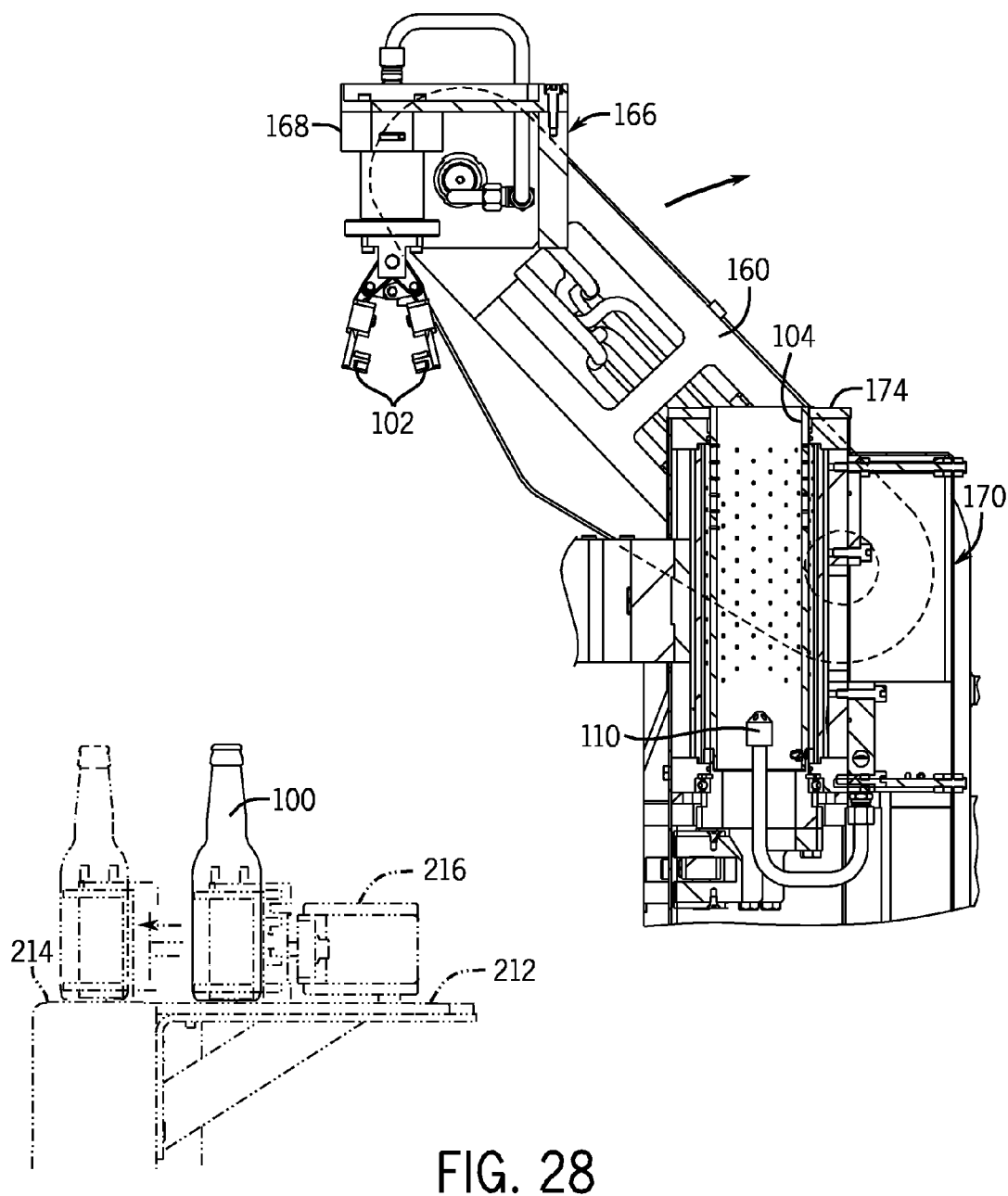

The tongs support member 166 will then be rotated counterclockwise in an arc with the tongs 102 delivering the thermally strengthened glass container 100 where its bottom is resting on the deadplate 212, as shown in FIG. 27. At this point, the tongs drive arm 160 is approximately horizontal, and the tongs 102 will release the finish of the thermally strengthened glass container 100 and begin to rotate clockwise, leaving the thermally strengthened glass container 100 on the deadplate 212. As the tongs drive arm 160 continues to rotate clockwise, the pusher mechanism 216 will push the thermally strengthened glass container 100 onto the exit conveyor 214, as shown in FIG. 28.

Figure 29:
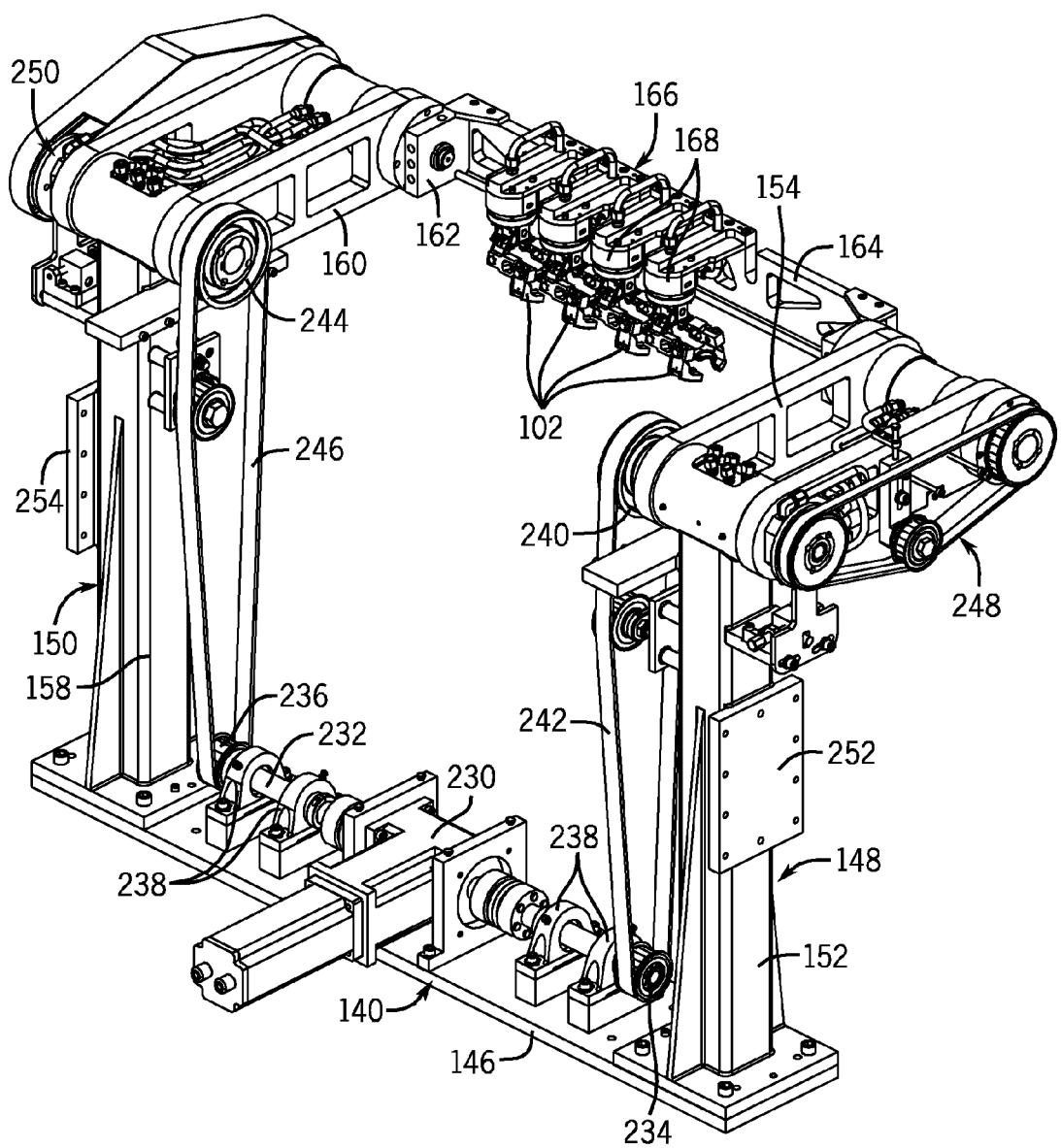
FIG. 29 is an isometric view of the takeout tongs operating assembly of the post-manufacture glass container thermal strengthening apparatus shown in FIG. 19.

Referring next to FIG. 29, the installation of the tongs arm support apparatus 148 and 150 onto the support member 140 and the installation of the tongs support member 166 onto the tongs drive arms 154 and 160 are illustrated. The support member 140 is shown with both the operating mechanism cover 145 and the upright drive covers 142 and 144 (all of which are shown in FIG. 19) removed for clarity. The support post 152 of the tongs arm support apparatus 148 is mounted onto the base member 146 at end thereof, and the support post 158 of the tongs arm support apparatus 150 is mounted onto the base member 146 at the other end thereof. The tongs drive arm 154 of the tongs arm support apparatus 148 is supported for rotation at the top end of the support post 152, and the tongs drive arm 160 of the tongs arm support apparatus 150 is supported at the top end of the support post 158.

A drive motor 230 is mounted on the base member 146 of the support member 140 at the center thereof, and operates to rotate a drive shaft 232 having toothed pulleys 234 and 236 mounted on the respective ends thereof and supported for rotation by four bearing support members 238. The toothed pulley 234 drives a toothed pulley 240 that rotates the tongs drive arm 154 through a toothed belt 242. The toothed pulley 236 drives a toothed pulley 244 that rotates the tongs drive arm 160 through a toothed belt 246. Located on and moving with the tongs drive arm 154 is a tongs support rotation member indicated generally by the reference numeral 248, and located on and moving with the tongs drive arm 160 is a tongs support rotation member indicated generally by the reference numeral 250.

The tongs support rotation member 248 and 250 operate to maintain the tongs support member 166 in its vertical orientation as the tongs drive arms 154 and 160 drive the tongs support member 166 through the arc as described in conjunction with FIGS. 21 through 28. Mounted on the outer side of the support post 152 of the tongs arm support apparatus 148 is a support bracket 252, and mounted on the outer side of the support post 158 of the tongs arm support apparatus 150 is a support bracket 254. The support brackets 252 and 254 will support the cooling tube support assembly 176 and the cooling tube assembly 184 (both of which are shown in FIG. 19).

Figure 30:
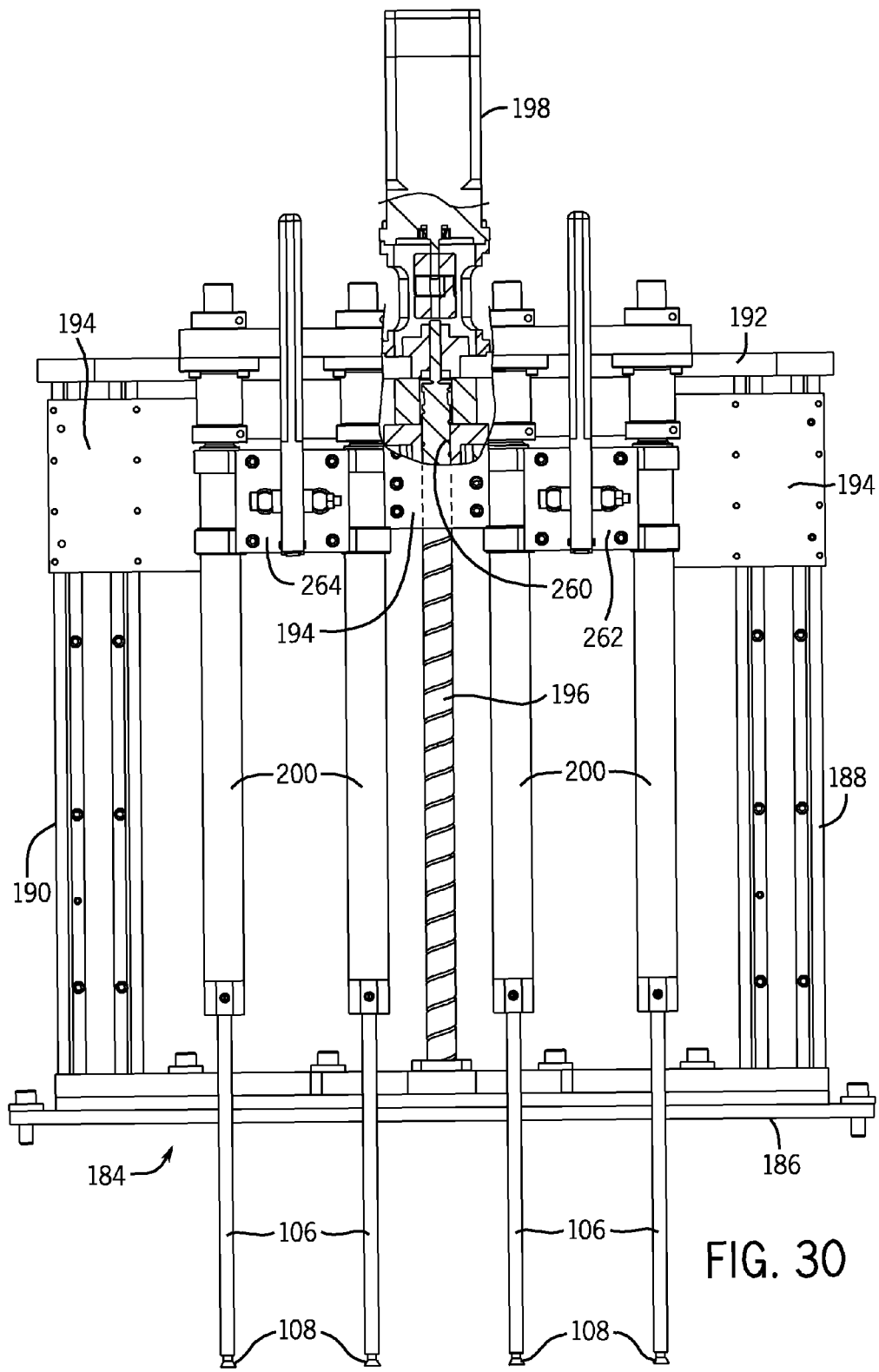
FIG. 30 is a plan view of the cooling tube operating assembly of the post-manufacture glass container thermal strengthening apparatus shown in FIG. 19.

Referring next to FIG. 30, the crossbar 194 is mounted onto the support rail 188 and 190 for vertical movement between the support plate 192 and the base plate 186. The crossbar 194 is driven by the motor 198, which drives the screw mechanism 196 that extends through a threaded aperture 260 in the crossbar 194. Two of the tube support sleeves 200 are mounted on a tube support plate 262, and the other two tube support sleeves 200 are mounted on a tube support plate 264. The two tube support plates 262 and 264 are in turn mounted onto the crossbar 194.

Figure 31:
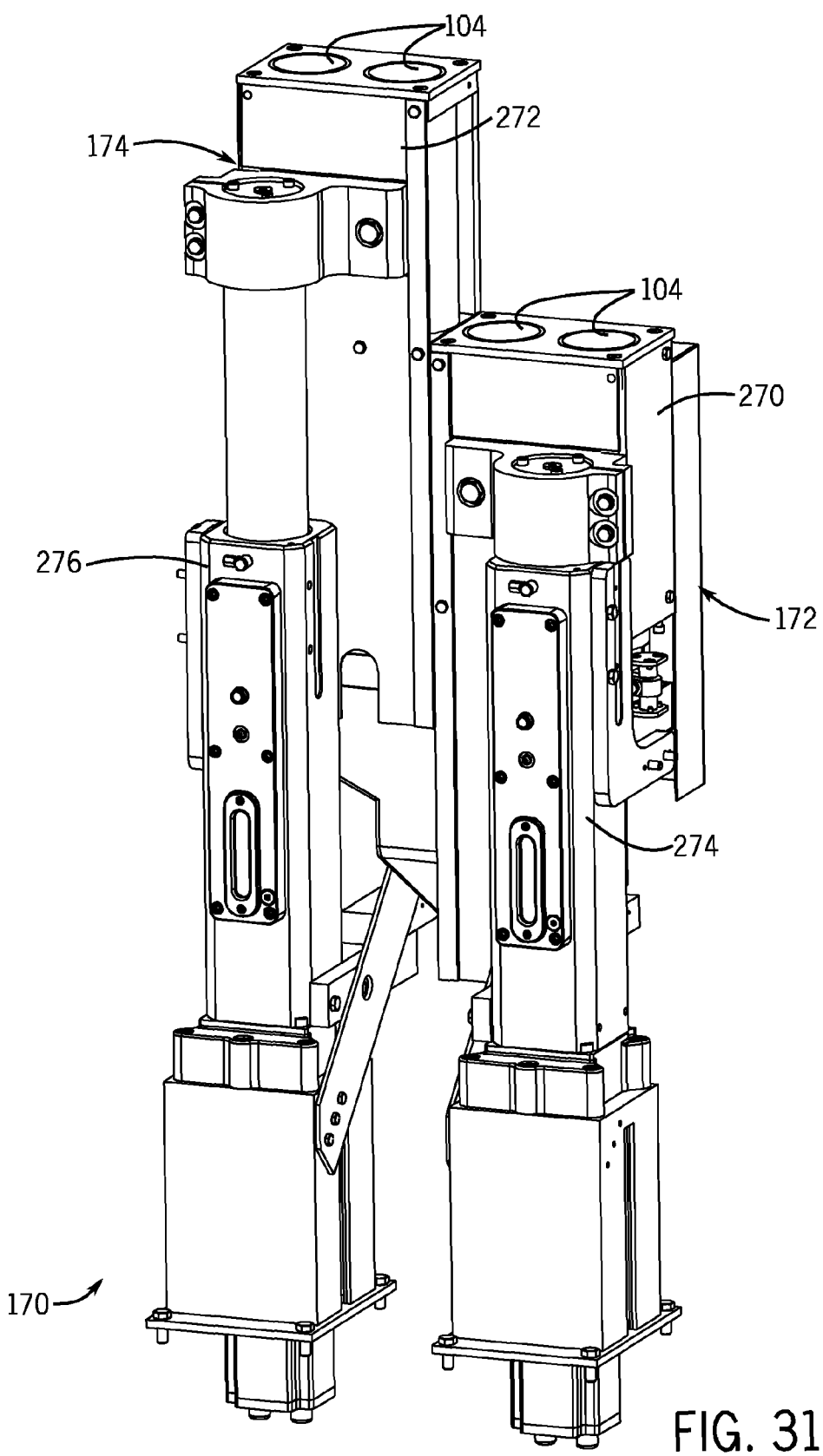
FIG. 31 is a an isometric view of two cooling shroud mechanisms of the cooling portion of the post-manufacture glass container thermal strengthening process practiced by the present invention illustrated in FIGS. 19 and 20, each of which cooling shroud mechanisms is for cooling two containers, showing one of the cooling shroud mechanisms raised and the other of the cooling shroud mechanisms lowered.

Referring next to FIG. 31, portions of the shroud mechanism subassembly 172 and the shroud mechanism subassembly 174 are shown, again with the shroud mechanism subassembly 172 in its lowered or inactive position and the shroud mechanism subassembly 174 in its raised or cooling position (although in operation typically both the shroud mechanism subassemblies 172 and 174 would operate together in the same positions). It may be seen that each of the shroud mechanism subassemblies 172 and 174 have a pair of cooling shrouds 104 respectively mounted in shroud housings 270 and 272. The shroud housings 270 and 272 are respectively raised and lowered with electromechanically actuator mechanisms 274 and 276 (which are each typically a servo-driven screw mechanism) mounted on the operating mechanism cover 145 of the support member 140 (both of which are shown in FIG. 19) on which the post-manufacture glass container thermal strengthening apparatus is located.

Figure 32:
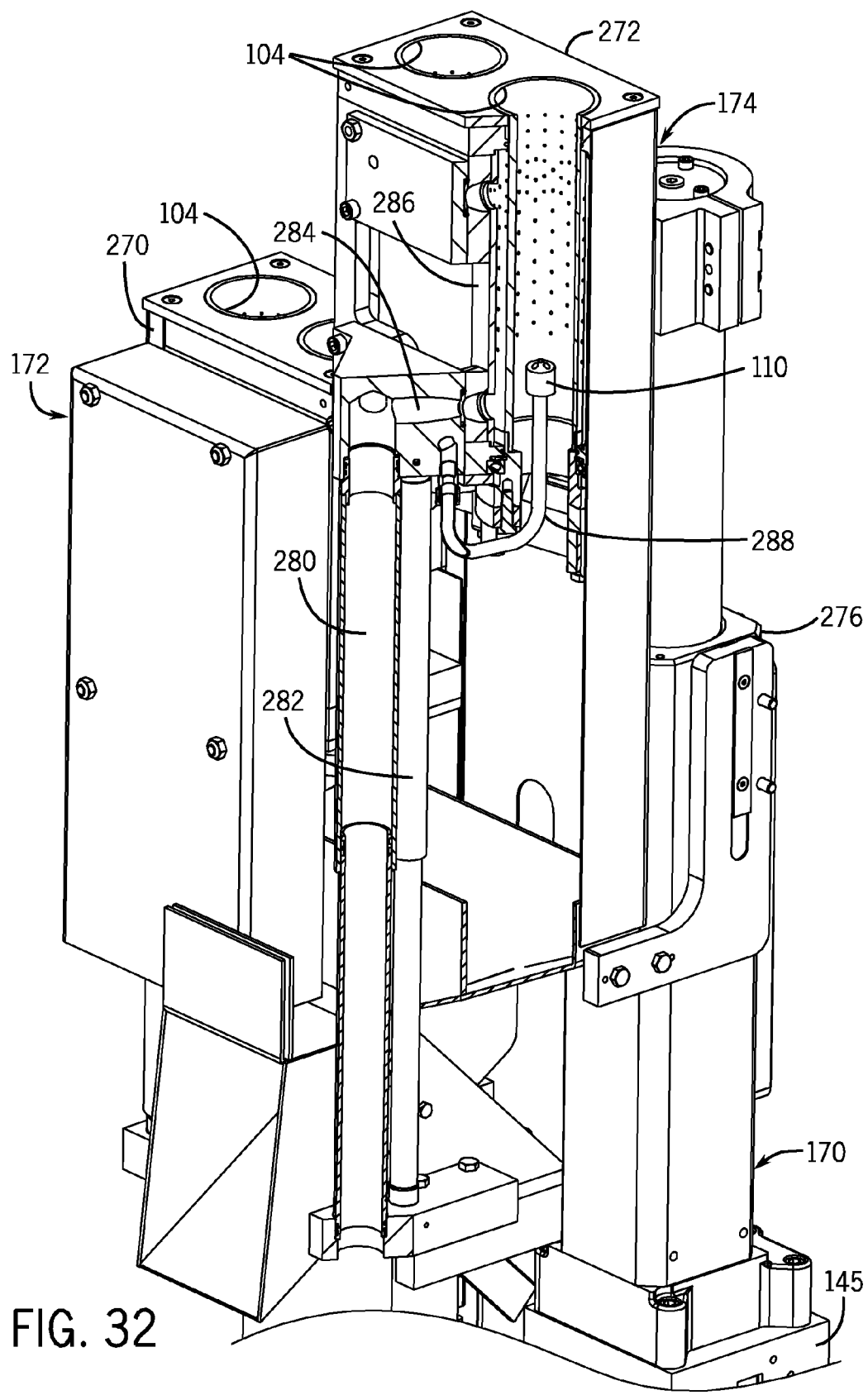
FIGS. 32 through 35 are partially cutaway cross-sectional views of the cooling shroud mechanisms illustrated in FIG. 31, showing the telescoping mechanisms providing cooling air to the cooling shrouds and the base cooling nozzles.

Referring now to FIG. 32, a portion of the shroud mechanism subassembly 174 is cut away to show some of the mechanisms contained therein. Specifically, a telescopic shroud air supply tube 280 and a telescopic base air supply tube 282 are shown that respectively supply cooling air to the cooling shroud 104 and the bottom cooling nozzle 110. Thus, as the shroud mechanism subassembly 174 is raised and lowered, the supply tubes 280 and 282 will extend and contract. The shroud air supply tube 280 leads to a passageway 284 supplying cooling air to a shroud cooling cavity 286 located intermediate the shroud housing 272 and both of the cooling shrouds 104 located in the shroud housing 272.

Preferably, the cooling shrouds 104 are installed in the shroud housing 272 such that the shroud cooling cavity 286 is sealed at the top and bottom of the cooling shrouds 104 so that all cooling air supplied through the shroud air supply tube 280 will be delivered through the orthogonal apertures 112 and the angled apertures 114 in the cooling shroud 104 (which are best shown in FIGS. 5 and 6). The cooling shroud 104 is optionally rotated during the cooling operation, as will become evident below in conjunction with a discussion of FIG. 35. (If desired, the cooling shrouds 104 may optionally be mounted for axial rotation in the shroud housing 160 as well.)

The base air supply tube 282 leads to a nozzle supply tube 288 that rigidly supports the bottom cooling nozzle 110 in position within the cooling shroud 104. Cooling air delivered through the base air supply tube 282 will be delivered to the centrally located aperture 132 and the angled apertures 134 in the bottom cooling nozzle 110 (shown in FIGS. 16 through 18).

Figure 33:
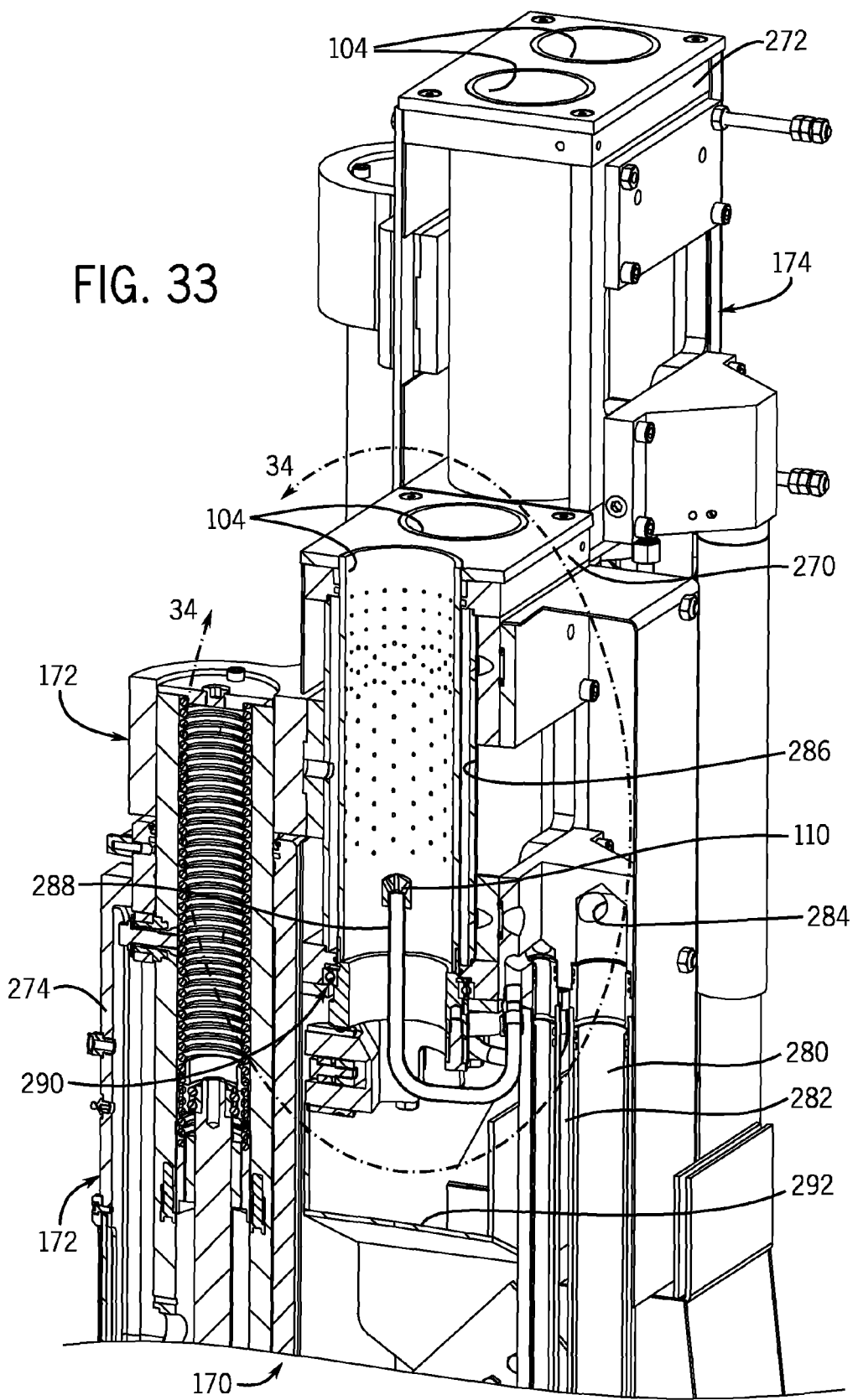
Figure 34:
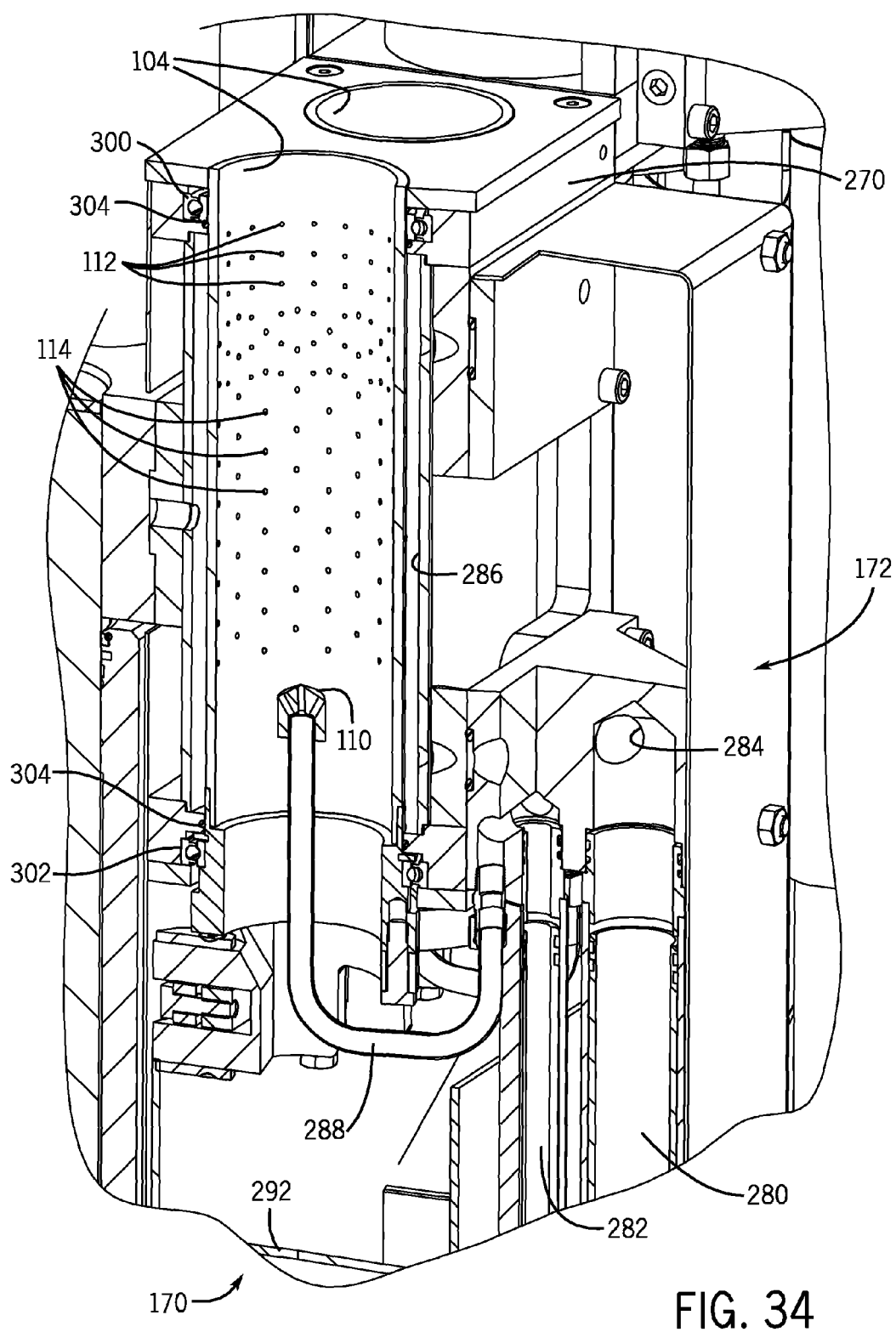

Referring next to FIGS. 33 and 34, additional detail of the shroud mechanism subassembly 172 is illustrated. The location of a shroud rotation mechanism is indicated with the reference numeral 290. Also, the location of a cullet chute 292 below the cooling shrouds 104 in the shroud housing 270 is indicated. It should be noted that since the cooling shrouds 104 are open at the bottom (as well as at the top), and since the nozzle supply tubes 288 and the bottom cooling nozzles 110 are sized and placed so as to leave the opening at the bottom of the cooling shrouds 104 largely unobstructed, should glass containers 100 break while inside the cooling shrouds 104, the broken glass may freely fall out of the cooling shrouds 104 and into the cullet chute 292, from which is may be directed to a collection area (not shown in FIG. 33 or 34).

Figure 35:
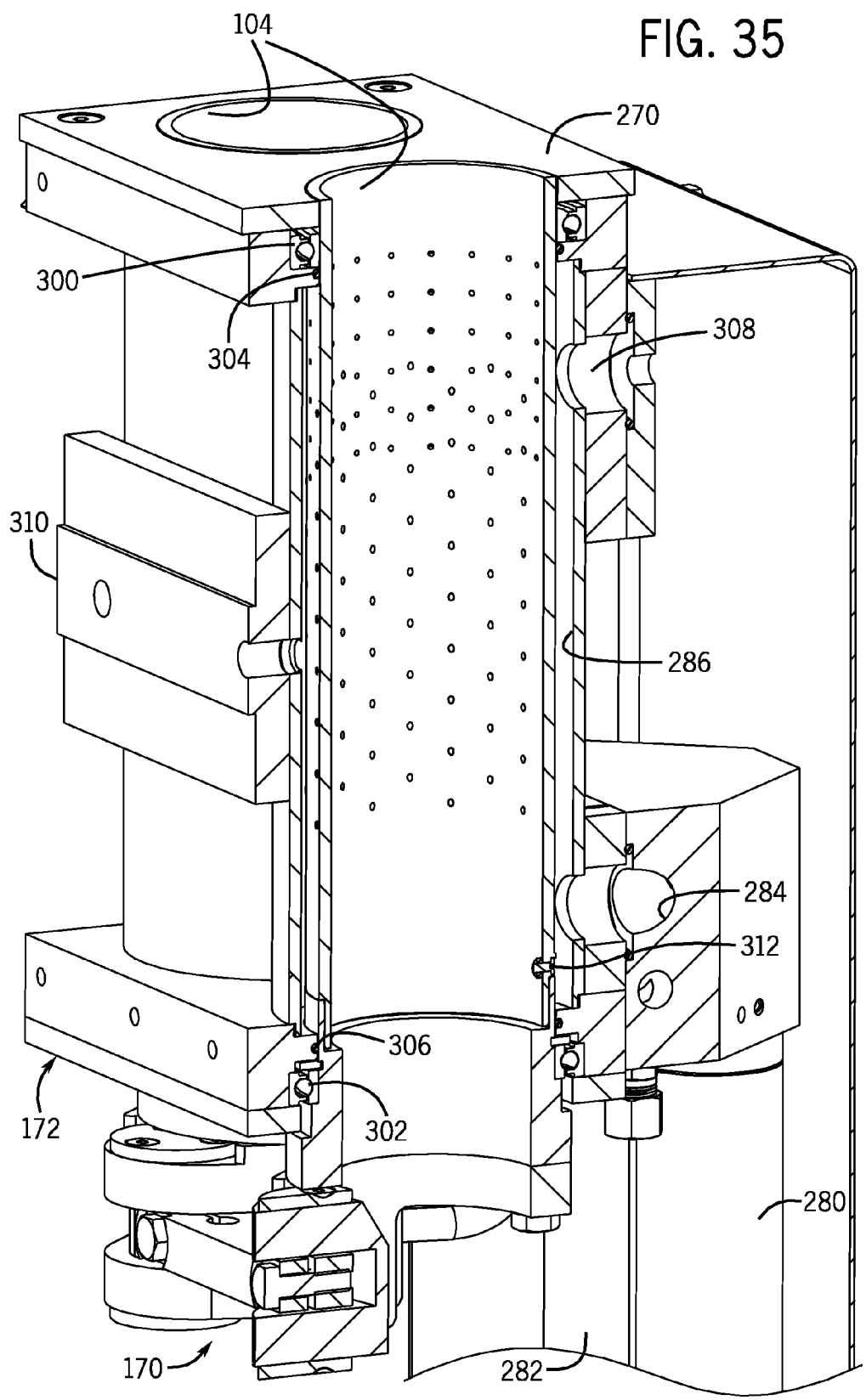

Referring now to FIG. 35, additional hardware for use in an embodiment in which the cooling shrouds 104 are rotated during the cooling operation is shown. Upper and lower bearings 300 and 302, respectively, are used to rotatably support the cooling shrouds 104 in the shroud housing 270. Located below the upper bearing 300 is an upper sealing member 304, and located above the lower bearing 302 is a lower sealing member 306. If desired, the shroud air supply tube 280 (shown in FIG. 32) can also provide cooling air through an additional passageway 308 (in addition to the passageway 284 shown in FIG. 32). A mounting surface 310 is shown in the side of the shroud housing 160. Finally, a locating pin 312 for rotation of the cooling shroud 104 is shown near the bottom thereof. The motor and the linkage driving 312 are not shown in FIG. 35.

Figure 36:
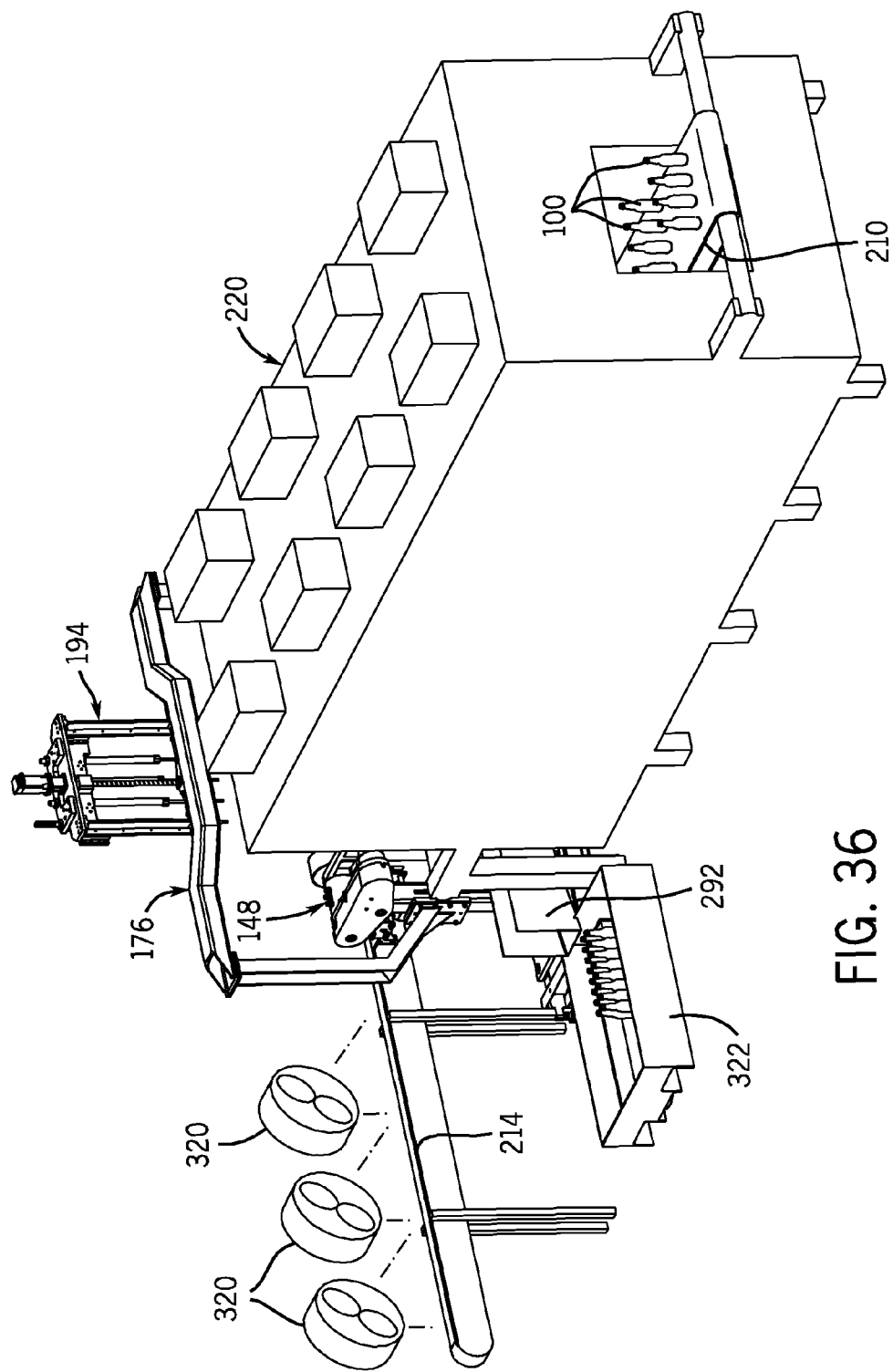
FIG. 36 is an isometric view showing a special tempering Lehr having a supply conveyer extending therethrough to deliver reheated glass containers to the cooling tube operating assembly shown in FIGS. 19 and 20.
Figure 37:
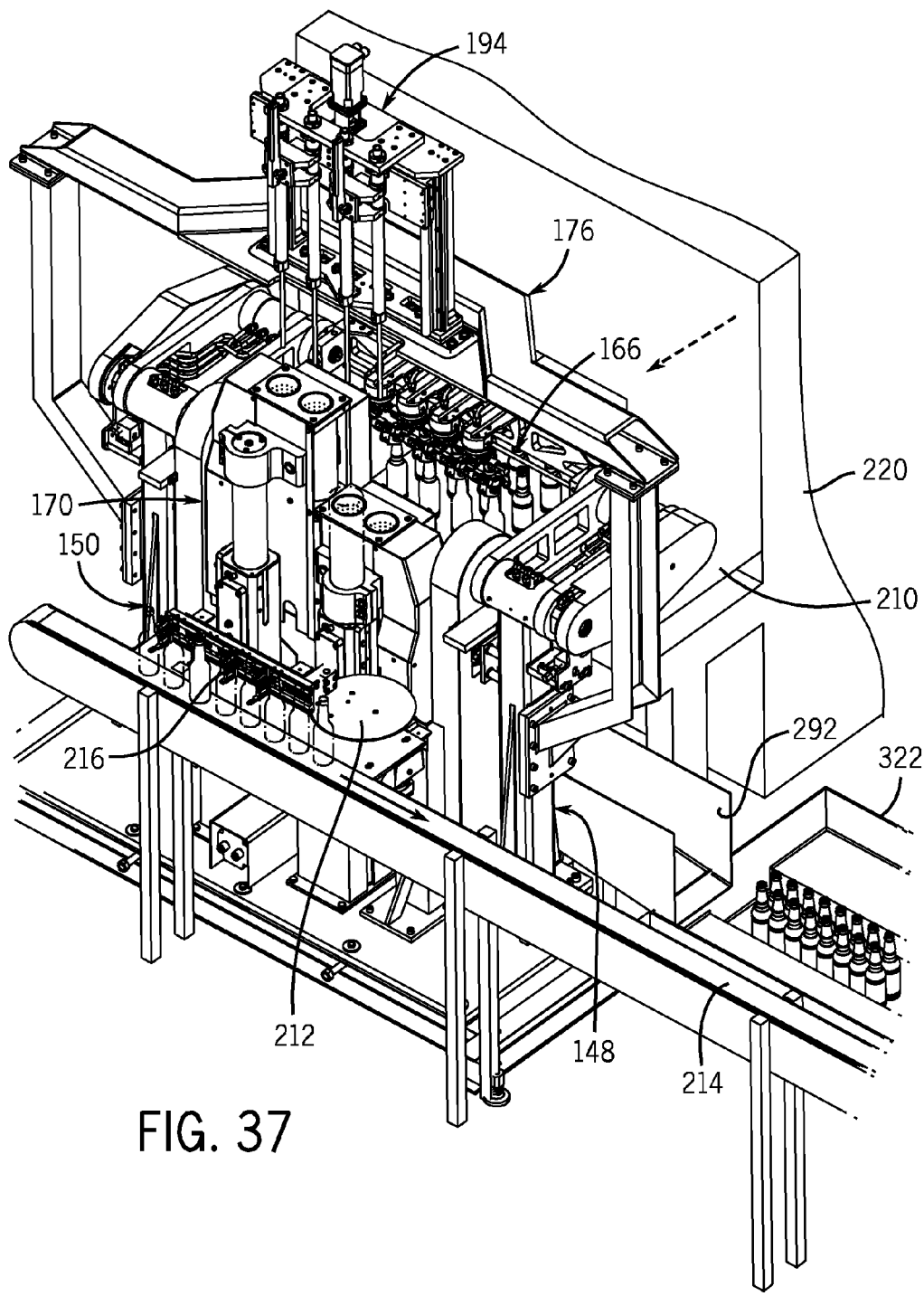
FIG. 37 is an isometric view showing the cooling tube operating assembly and a deadplate, an exit conveyor, and a pusher mechanism and a portion of the special tempering Lehr from a side opposite the side shown in FIG. 36.
Figure 38:
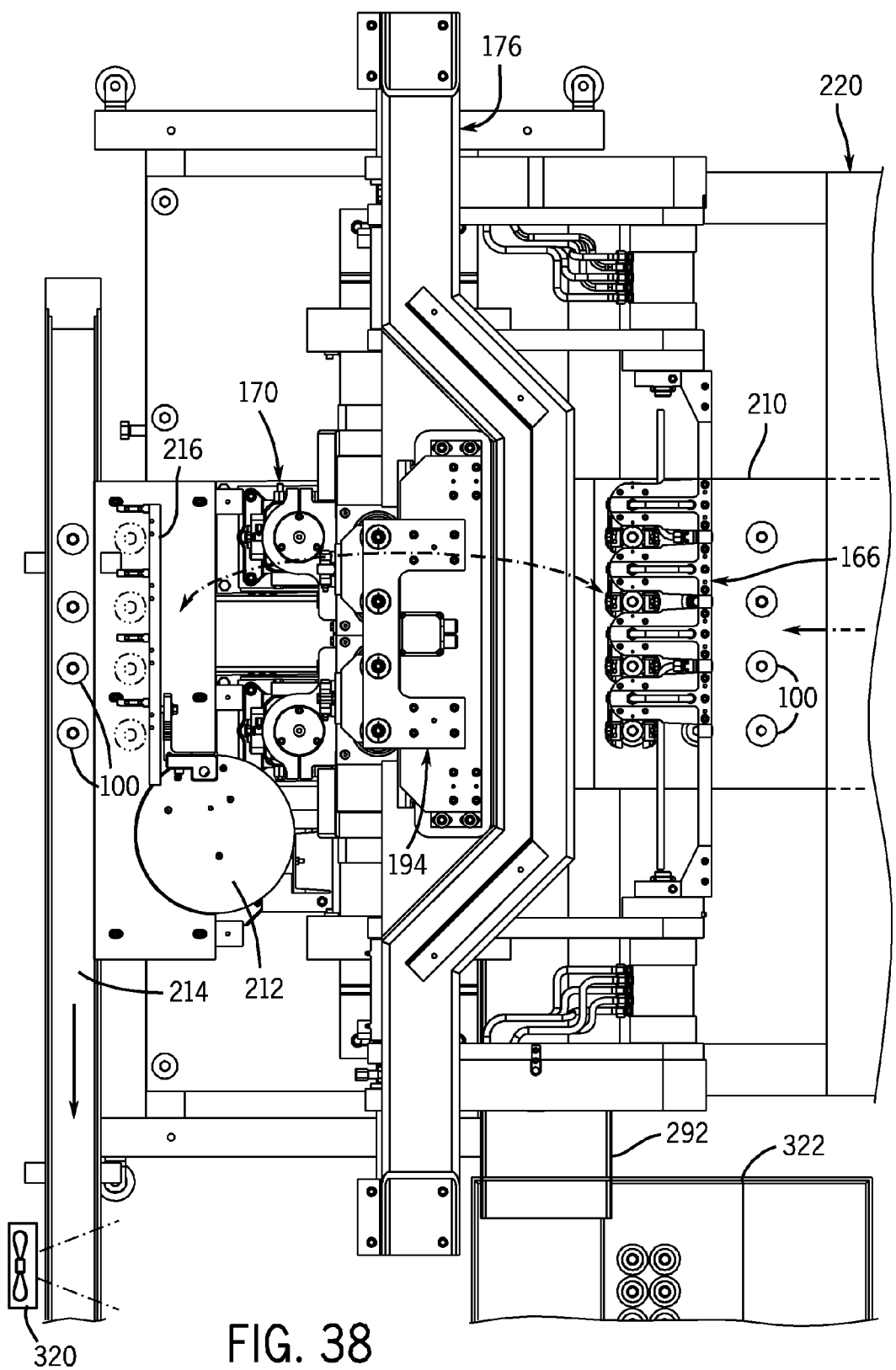
FIG. 38 is a top plan view showing the cooling tube operating assembly and a portion of the special tempering Lehr shown in FIG. 36.

Referring next to FIGS. 36 through 38, an exemplary manufacturing line for the post-manufacture glass container thermal strengthening process practiced by the present invention that is located downstream of the hot end (the I.S. machines molding the glass containers, not illustrated herein) and upstream of the cold end (the coating and inspection machines, not illustrated herein) is illustrated. The special tempering Lehr 220 has the supply conveyor 210 running therethrough. Glass containers 100 formed in an I.S. machine (not shown) are placed onto the supply conveyor 210 at the right side of the special tempering Lehr 220 as illustrated in FIG. 36 after having been discharged from the I.S. machine. As the glass containers 100 enter the special tempering Lehr 220, they are typically between approximately 500 degrees Centigrade and approximately 600 degrees Centigrade.

The special tempering Lehr 220 is typically set at temperatures ranging from approximately 600 degrees Centigrade at the entrance zone (on the right side as illustrated in FIG. 36) to approximately 715 degrees Centigrade at the exit zone (on the right side as illustrated in FIG. 37). A typical size for the special tempering Lehr 220 is approximately sixteen feet (4.9 meters) long. The special tempering Lehr 220 may have, for example, four independent temperature controlled zones. The glass containers 100 will typically spend between two and one-half to three and one-half minutes in the special tempering Lehr 220, and will be heated to a temperature of approximately 620 degrees Centigrade to approximately 680 degrees Centigrade in the special tempering Lehr 220. This range is significant since if the glass containers are below 620 degrees Centigrade it is not possible to obtain adequate compressive stresses in the post-manufacture glass container thermal strengthening process practiced by the present invention, and if the glass containers are above approximately 680 degrees Centigrade deformations may occur in them.

Following the performance of the post-manufacture glass container thermal strengthening process, the thermally strengthened glass containers 100 are deposited on the deadplate 212. The thermally strengthened glass containers 100 are then pushed by the pusher mechanism 216 onto the exit conveyor 214, which takes them away from the post-manufacture glass container thermal strengthening apparatus. Since the thermally strengthened glass containers 100 are still quite hot (although they are uniformly well below the Strain Point 70), they may be subjected to cooling air from a schematically illustrated fan array 320 for cooling them more completely before they reach the cold end equipment (not shown herein). Also shown in FIGS. 37 and 38 is the cullet chute 292 for collecting broken glass falling out of the post-manufacture glass container thermal strengthening apparatus, which broken glass is collected in a collection bin 322.

Figure 42:
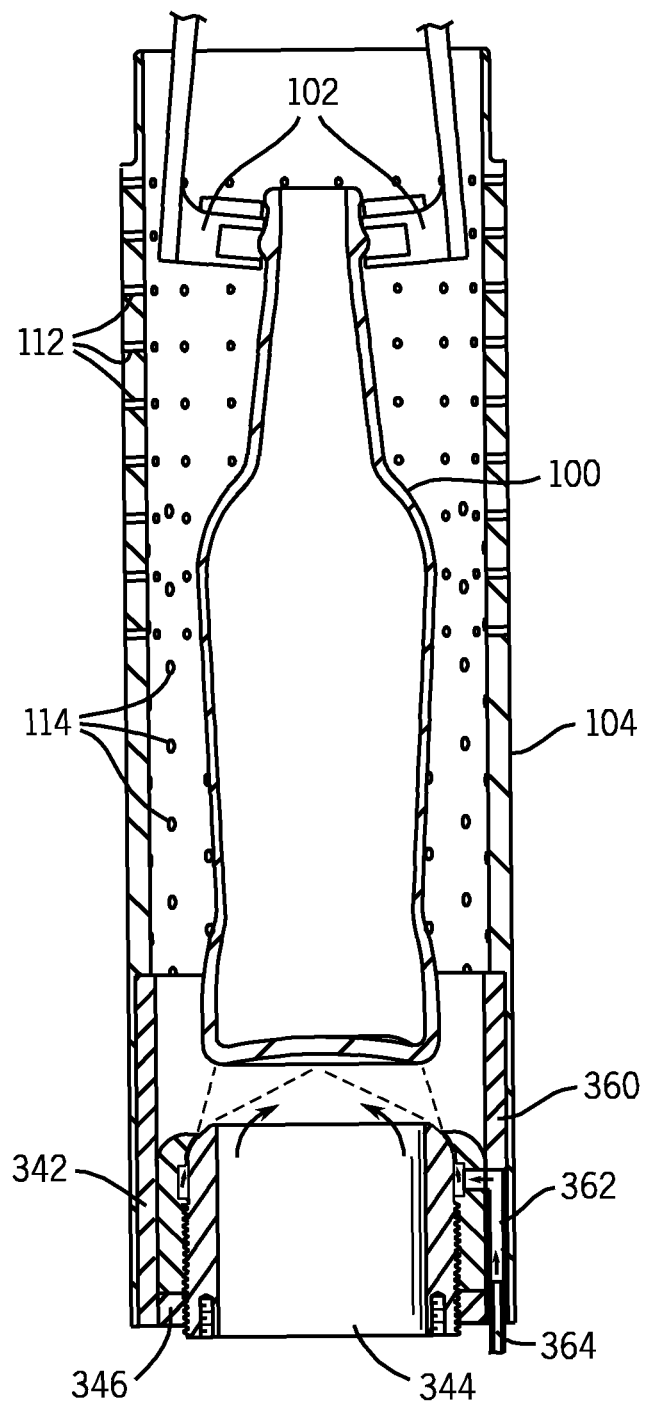
FIG. 42 is a cross-sectional view of the alternate embodiment bottom cooler illustrated in FIGS. 39 through 41 in the bottom of the cooling shroud illustrated in FIGS. 5 through 12.

Referring next to FIGS. 39 through 41, an alternate embodiment bottom cooler 340 for mounting in the bottom of the cooling shroud 104 as shown in FIG. 42 is illustrated. Instead of using the bottom cooling nozzle 110 best shown in FIGS. 5 and 6 which is centrally located directly under the bottom of the glass container 100, the bottom cooler 340 may be advantageous in that is offers excellent bottom cooling characteristics while presenting less of an obstruction to pieces of a glass container 100 that may break during the performance of the post-manufacture glass container thermal strengthening method described herein due to defects. Those skilled in the art will realize that if a piece of broken glass hangs up on the bottom cooling nozzle 110, the apparatus may have to be stopped to manually remove the broken glass.

The bottom cooler 340 instead is of a design which is entirely located close to the inner wall of the cooling shroud 104 near the bottom thereof, and as such is entirely open under the bottom of a glass container 100 that is being thermally strengthened. The bottom cooler 340 includes a hollow cylindrical outer adjustable sleeve 342, a hollow cylindrical inner sleeve 344, and an annular locking element 346. The upper portion of the outside of the inner sleeve 344 is curved inwardly at the top thereof in a cross-sectionally arcuate manner as indicated by the reference numeral 348. The bottom portion of the inner sleeve 344 is threaded on the outer surface thereof.

The upper portion of the inside of the outer adjustable sleeve 342 is curved inwardly at the top thereof in a cross-sectionally arcuate manner as indicated by the reference numeral 350. The inside of the outer adjustable sleeve 342 has an annular recess 352 located therein immediately below the inwardly curved portion 350. The outer adjustable sleeve 342 also has an inlet 354 leading from the outer surface of the outer adjustable sleeve 342 to the interior of the annular recess 352. The bottom portion of the outer adjustable sleeve 342 is threaded on the inner surface thereof a short distance below the annular recess 352.

The outer adjustable sleeve 342 is screwed onto the inner sleeve 344 so that the inwardly curved portion 350 in the outer adjustable sleeve 342 and the inwardly curved portion 348 in the inner sleeve 344 define a gap 356 therebetween which will be the air outlet from the bottom cooler. The size of the gap 356 may be adjusted by rotating the outer adjustable sleeve 342 with respect to the inner sleeve 344. Once the gap 356 has been adjusted as desired, the annular locking element 346 is screwed onto the threads on the outside of the inner sleeve 344 until it engages and locks further rotation of the outer adjustable sleeve 342 on the toothed pulley 244.

Referring now to FIG. 42, the bottom cooler is shown installed into a sleeve 360 located inside the bottom portion of the cooling shroud 104. It may be seen that the sleeve 360 has a passageway 362 located in the bottom portion thereof that communicates between the inlet 354 in the outer adjustable sleeve 342 and an air supply tube 364 extending from the bottom of the sleeve 360. Thus, cooling air is supplied from the air supply tube 364 to the bottom cooler, from which it is directed through the gap 356 between the inwardly curved portion 350 of the outer adjustable sleeve 342 and the inwardly curved portion 348 of the inner sleeve 344 at a high velocity onto the bottom of the glass container 100.

The bottom cooler shown in FIGS. 39 through 42 uses the Coanda effect, which causes the entrainment of ambient air around a fluid jet. Thus, the fluid jet emitted from the gap 356 between the inwardly curved portion 350 of the outer adjustable sleeve 342 and the inwardly curved portion 348 of the inner sleeve 344 will entrain ambient air located near the inner diameter of the inner sleeve 344 near the top thereof to thereby increase the amount of air that is directed onto the bottom of the glass container 100, thereby increasing the efficiency of the cooling of the bottom of the glass container 100.

Figure 43:
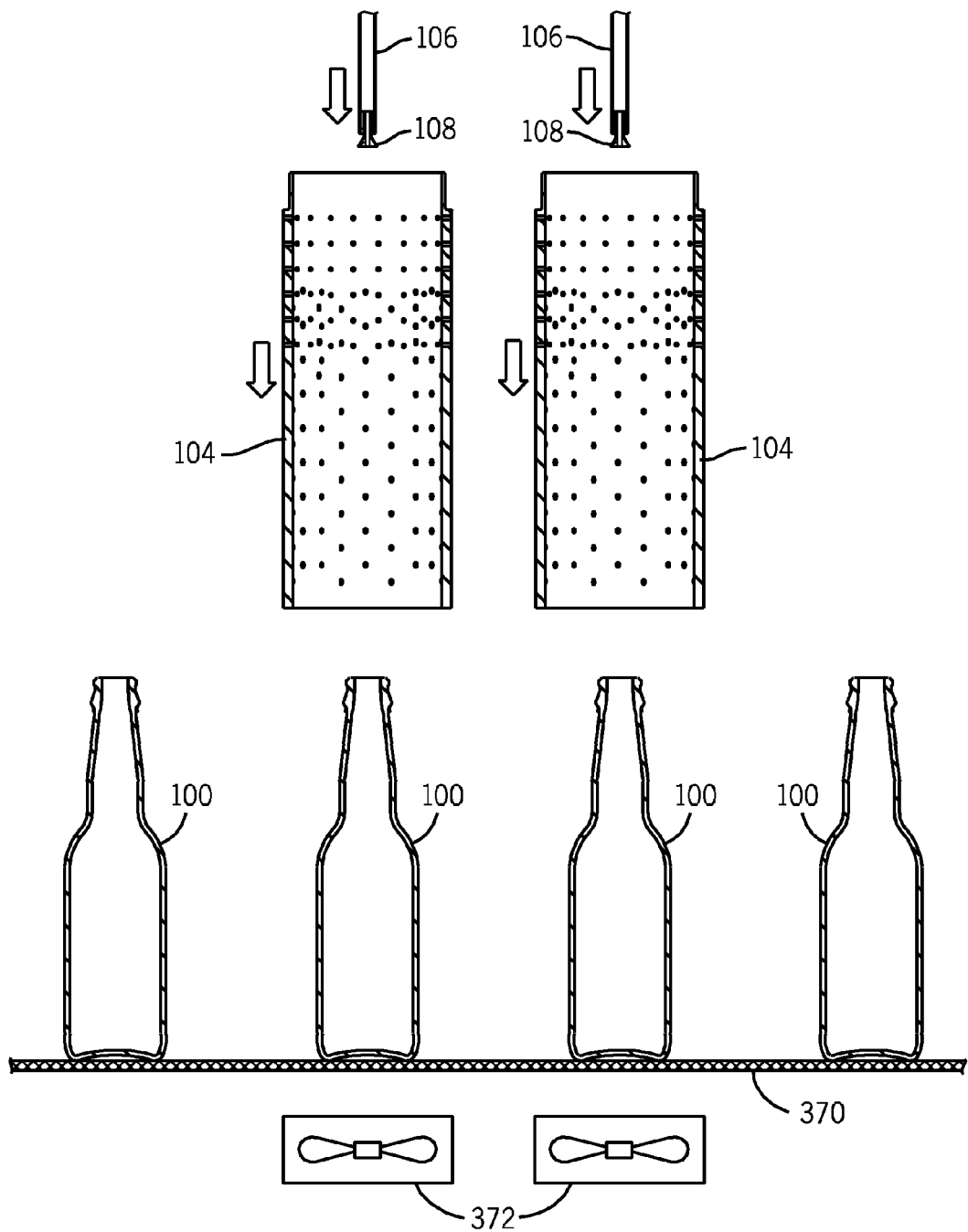
FIG. 43 is a schematic cross-sectional depiction of an alternate embodiment post-manufacture glass container thermal strengthening apparatus and method, showing cooling shrouds and cooling tubes mounted above some glass containers on an air permeable conveyor and schematically depicted bottom cooling apparatus located below the glass containers below the cooling shrouds and cooling tubes.
Figure 44:
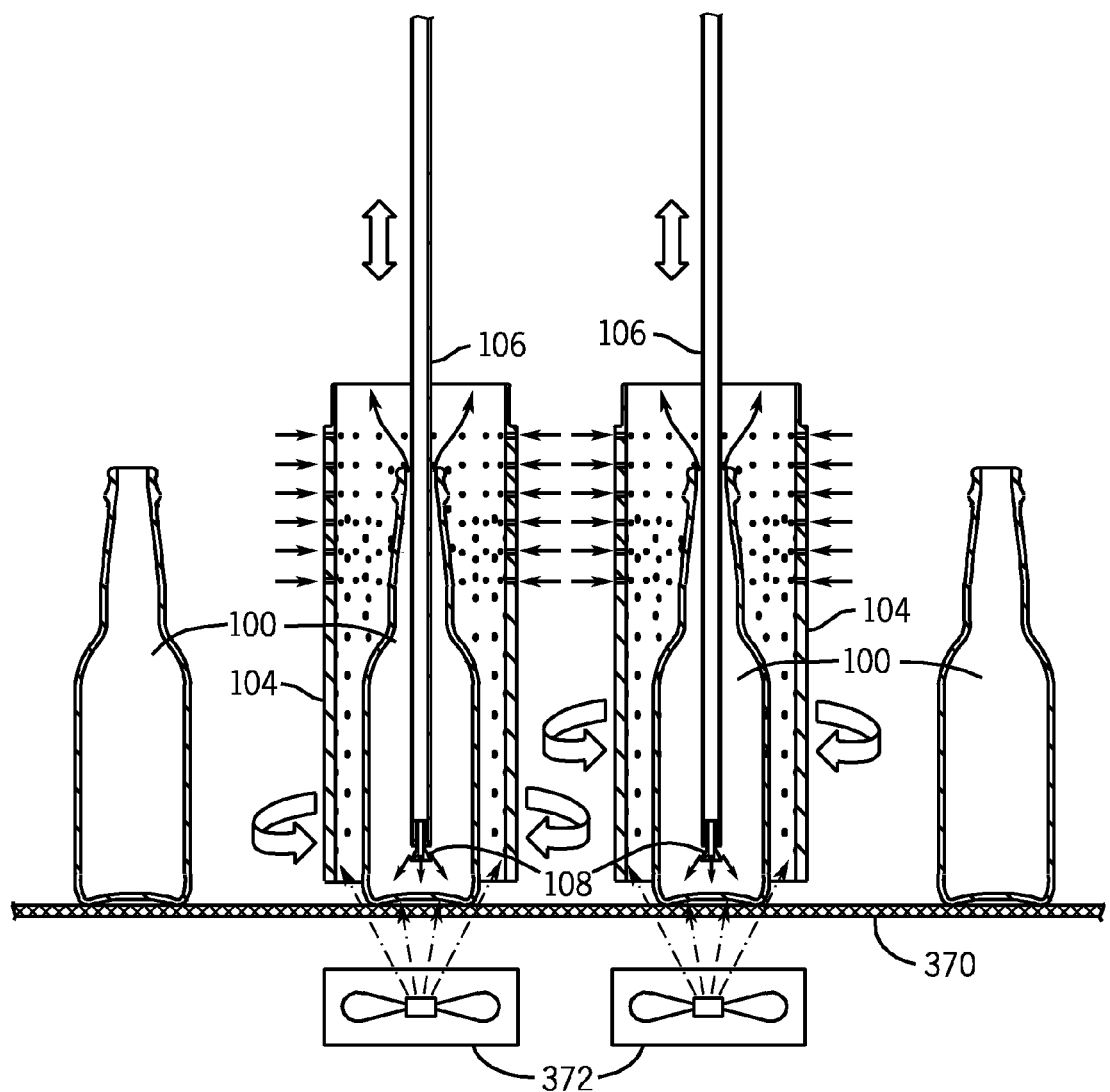
FIG. 44 is a schematic cross-sectional depiction of the alternate embodiment post-manufacture glass container thermal strengthening apparatus and method illustrated in FIG. 43, showing the cooling shrouds and cooling tubes lowered over some glass containers on the air permeable conveyor and the cooling apparatus located below the glass containers below the cooling shrouds and cooling tubes cooling the glass containers.

Referring finally to FIGS. 43 and 44, an alternate embodiment post-manufacture glass container thermal strengthening apparatus and related method are schematically illustrated. Rather than using an apparatus that removes the reheated glass containers 100 from a supply conveyor, thermally strengthens the glass containers 100, and then deposits the thermally strengthened glass containers 100 onto an exit conveyor, the method schematically illustrated in FIGS. 43 and 44 maintains the glass containers 100 on an air-porous conveyor 370 throughout the thermal strengthening process.

Instead, the cooling shrouds 104 and the cooling tube 106 and the tube nozzle 108 are lowered onto the reheated glass containers 100, until the bottoms of the cooling shrouds 104 are just above the upper surface of the porous conveyor 370. Bottom cooling elements 372 are located below the porous conveyor 370 and the cooling shrouds 104, and direct cooling air upwardly onto the bottoms of the reheated glass containers 100. Simultaneously, cooling air is supplied to the sides of the reheated glass containers 100 along their entire height to cool their outside surfaces, and the cooling tube 106 and the tube nozzle 108 are lowered into the interior of the reheated glass containers 100 to cool their interiors. The cooling tube 106 and the tube nozzle 108 may be oscillated as described above.

Two different methods are contemplated by this alternate embodiment. In one embodiment, the bottom cooling elements 372 is stopped while the thermal strengthening process is performed, after which the bottom cooling elements 372 is moved to advance the next set of reheated glass containers 100 to be thermally strengthened. In the other embodiment, the post-manufacture glass container thermal strengthening apparatus moved together with the bottom cooling elements 372, in which case there must be a sufficient longitudinal number of thermally strengthening sets to allow the bottom cooling elements 372 to continue without stopping.

It may therefore be appreciated from the above detailed description of the exemplary embodiments practiced by the present invention that it teaches a base cooling nozzle in an apparatus for thermally strengthening a glass container in a thermal strengthening post-manufacture process that results in an increase in the strength of the glass containers manufactured according to the process. This increase in the strength of glass containers is obtainable by the post-manufacture glass container thermal strengthening process practiced by the present invention for glass containers of any design geometry. The post-manufacture glass container thermal strengthening process enables the manufacture of lighter weight glass containers that have at least the same strength as conventional non-light weight glass containers.

The post-manufacture glass container thermal strengthening process practiced by the present invention is fully adaptable to most if not all existing glass container manufacturing lines. Further, the post-manufacture glass container thermal strengthening process does not require either a replacement or a reconfiguration of existing I.S. machines at the hot end of glass container manufacturing lines. The post-manufacture glass container thermal strengthening process strengthens glass containers without requiring the use of chemical strengthening methods to alter their hardness characteristics.

The apparatus used in the post-manufacture glass container thermal strengthening process practiced by the present invention is of a construction which is both durable and long lasting, and which will require little or no maintenance to be provided by the user throughout its operating lifetime. The advantages provided by the post-manufacture glass container thermal strengthening process practiced by the present invention substantially enhance its market appeal and thereby afford it the broadest possible market. Finally, all of the aforesaid advantages and objectives of the post-manufacture glass container thermal strengthening process practiced by the present invention are achieved without incurring any substantial relative disadvantage.

Although the foregoing description of the post-manufacture glass container thermal strengthening process practiced by the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. An apparatus for thermally strengthening glass containers after they are formed in an I.S. machine, comprising:
   a special tempering Lehr that reheats the glass containers to increase their temperature to a temperature that is sufficiently high to obtain adequate compressive stresses in the glass containers but not so high that the glass containers may become deformed; and
   a cooling station that simultaneously cools the outer and inner surfaces of glass containers in the cooling station rapidly so that all of the stresses in the glass container are locked in, the cooling station comprising:
      a cooling tube for insertion into the interior of the glass container located in the cooling station, the cooling tube having a tube nozzle at the distal end thereof that delivers cooling air into the interior of the glass container;
      a cooling shroud that directs cooling air onto the outer sides of a glass container located in the cooling station; and
      a bottom cooling apparatus that directs cooling air upwardly onto the bottom of the glass container located in the cooling station;
   wherein the bottom cooling apparatus includes a bottom cooler defining an open central aperture and an annular cooling gap located radially outwardly from the open central aperture, the bottom cooler being configured to direct cooling air from the annular cooling gap toward the glass container.

2. An apparatus as defined in claim 1, wherein the bottom cooling apparatus is configured to direct cooling air from a location above a lower axial periphery of the cooling shroud toward the glass container.

3. An apparatus as defined in claim 1, wherein the bottom cooling apparatus comprises:
   a nozzle supply tube that rigidly supports the bottom cooler in position within the cooling shroud below the glass container located in the cooling station.

4. The apparatus of claim 1, wherein the bottom cooler is configured to allow broken glass in the cooling shroud to exit the cooling shroud through the open central aperture.

5. The apparatus of claim 1, wherein the bottom cooler includes an outer sleeve and an inner sleeve, the inner and outer sleeves defining the annular cooling gap therebetween.

6. The apparatus of claim 5, wherein the outer sleeve is adjustable relative to the inner sleeve to adjust the size of the annular cooling gap.

7. The apparatus of claim 5, wherein the outer sleeve includes an upper portion curved radially inwardly.

8. The apparatus of claim 5, wherein the inner sleeve includes an upper portion curved radially inwardly.

9. The apparatus of claim 5, wherein the bottom cooler includes an additional sleeve coupled to the cooling shroud, the outer sleeve being coupled to the additional sleeve.

10. An apparatus for thermally strengthening glass containers after they are formed in an I.S. machine, comprising:
   a special tempering Lehr that reheats the glass containers to increase their temperature to a temperature that is sufficiently high to obtain adequate compressive stresses in the glass containers but not so high that the glass containers may become deformed; and
   a cooling station that simultaneously cools the outer and inner surfaces of glass containers in the cooling station rapidly so that all of the stresses in the glass container are locked in, the cooling station comprising:
      a cooling tube for insertion into the interior of the glass container located in the cooling station, the cooling tube having a tube nozzle at the distal end thereof that delivers cooling air into the interior of the glass container;
      a cooling shroud that extends from an upper end to a lower end and directs cooling air onto the outer sides of a glass container located in the cooling station; and
      a bottom cooling apparatus that directs cooling air upwardly onto the bottom of the glass container located in the cooling station, the bottom cooling apparatus defining a central aperture, the bottom cooling apparatus being configured to direct cooling air toward the glass container from a location radially outwardly from the central aperture and above the lower end of the cooling shroud;
   wherein the bottom cooling apparatus defines an annular cooling gap located radially outwardly from the central aperture, the bottom cooler being configured to direct cooling air from the annular cooling gap toward the glass container.

11. An apparatus for thermally strengthening glass containers after they are formed in an I.S. machine, comprising:
   a special tempering Lehr that reheats the glass containers to increase their temperature to a temperature that is sufficiently high to obtain adequate compressive stresses in the glass containers but not so high that the glass containers may become deformed; and
   a cooling station that simultaneously cools the outer and inner surfaces of glass containers in the cooling station rapidly so that all of the stresses in the glass container are locked in, the cooling station comprising:
      a cooling shroud; and
      a bottom cooling apparatus that directs cooling air upwardly onto the bottom of the glass container located in the cooling station;
   wherein the bottom cooling apparatus comprises:
      a bottom cooler defining an annular aperture from which cooling air is directed toward the glass container;
   wherein the bottom cooler defines a central aperture and an annular cooling gap located radially outwardly from the central aperture, the bottom cooler being configured to direct cooling air from the annular cooling gap toward the glass container.

12. The apparatus of claim 11, wherein the cooling shroud extends from an upper first end to a lower second end, the bottom cooler being configured to direct cooling air from a location above the lower second end toward the glass container.

13. The apparatus of claim 11, wherein the bottom cooler is configured to direct cooling air from a location within the cooling shroud upwardly onto the bottom of the glass container.

* * * * *